(12) United States Patent
Agarwal

(10) Patent No.: US 8,738,470 B2
(45) Date of Patent: May 27, 2014

(54) PROVIDING GIFT CLUSTERING FUNCTIONALITY TO ASSIST A USER IN ORDERING MULTIPLE ITEMS FOR A RECIPIENT

(75) Inventor: Amit D. Agarwal, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 11/298,985

(22) Filed: Dec. 9, 2005

(65) Prior Publication Data

US 2006/0178946 A1 Aug. 10, 2006

Related U.S. Application Data

(63) Continuation of application No. 09/699,244, filed on Oct. 27, 2000, now Pat. No. 6,999,941.

(60) Provisional application No. 60/217,333, filed on Jul. 11, 2000.

(51) Int. Cl.
*G06Q 30/00* (2012.01)
*G06Q 30/06* (2012.01)

(52) U.S. Cl.
CPC ........ *G06Q 30/0633* (2013.01); *G06Q 30/0605* (2013.01); *G06Q 30/0625* (2013.01)
USPC ...................... 705/26.8; 705/26.2; 705/26.62

(58) Field of Classification Search
CPC .......... G06Q 30/0605; G06Q 30/0625; G06Q 30/0633; G06Q 30/0251; G06Q 30/0276; G06Q 30/0277
USPC .............. 705/14, 26, 27, 14.49, 14.72, 14.73, 705/26.2, 26.62, 26.8
See application file for complete search history.

(56) References Cited

U.S. PATENT DOCUMENTS

| | | | | |
|---|---|---|---|---|
| 5,113,896 | A | | 5/1992 | Tortellier ...................... 137/269 |
| 5,325,297 | A | * | 6/1994 | Bird et al. ...................... 715/201 |
| 5,754,981 | A | | 5/1998 | Veeneman et al. .............. 705/26 |
| 5,774,874 | A | | 6/1998 | Veeneman et al. .............. 705/27 |
| 5,819,284 | A | * | 10/1998 | Farber et al. .................. 709/203 |
| 5,826,039 | A | | 10/1998 | Jones ............................ 709/206 |

(Continued)

OTHER PUBLICATIONS

Tanner, L., "Tiethebow.com Takes Gift Shopping to New Level," Dallas Business Journal, vol. 23, No. 21, p. 10, Jan. 14, 2000.*

(Continued)

*Primary Examiner* — Nicholas D Rosen
(74) *Attorney, Agent, or Firm* — Seed IP Law Group PLLC

(57) ABSTRACT

A method and system for creating of gift clusters of multiple items in a client/server environment by users, and for the ordering of such user-defined gift clusters of multiple items. In particular, a user can specify multiple items to be associated together as a gift cluster, and can also specify a variety of descriptive information about the gift cluster. That user or another user can then order the gift cluster as a gift for themselves or for another recipient, and may also order the gift cluster for the same or different recipients multiple times. When customers are later searching for appropriate gift clusters, the various categorization or other descriptive information can then assist is identifying appropriate gift clusters. The gift clustering functionality may be provided by and work in conjunction with a particular item ordering service, or instead may work independently from any particular item ordering service.

67 Claims, 17 Drawing Sheets

(56) References Cited

U.S. PATENT DOCUMENTS

| | | | | |
|---|---|---|---|---|
| 5,852,810 | A * | 12/1998 | Sotiroff et al. | 705/27 |
| 5,873,076 | A * | 2/1999 | Barr et al. | 707/3 |
| 5,890,163 | A * | 3/1999 | Todd | 707/200 |
| 5,895,454 | A * | 4/1999 | Harrington | 705/26 |
| 5,895,468 | A | 4/1999 | Whitmyer, Jr. | 707/10 |
| 5,898,594 | A | 4/1999 | Leason et al. | 700/231 |
| 5,960,411 | A * | 9/1999 | Hartman et al. | 705/26 |
| 5,963,915 | A | 10/1999 | Kirsch | 705/26 |
| 5,970,474 | A | 10/1999 | LeRoy et al. | 705/27 |
| 6,016,504 | A | 1/2000 | Arnold et al. | 709/200 |
| 6,029,141 | A * | 2/2000 | Bezos et al. | 705/27 |
| 6,092,052 | A * | 7/2000 | Ziarno | 705/21 |
| 6,115,690 | A * | 9/2000 | Wong | 705/7 |
| 6,128,663 | A | 10/2000 | Thomas | 709/228 |
| 6,167,383 | A * | 12/2000 | Henson | 705/26 |
| 6,173,210 | B1 * | 1/2001 | Bjornson et al. | 700/99 |
| 6,249,773 | B1 * | 6/2001 | Allard et al. | 705/26 |
| 6,249,810 | B1 * | 6/2001 | Kiraly | 709/217 |
| 6,317,719 | B1 * | 11/2001 | Schrier et al. | 705/2 |
| 6,360,241 | B1 | 3/2002 | Matson et al. | 708/493 |
| 6,360,254 | B1 | 3/2002 | Linden et al. | 709/219 |
| 6,393,490 | B1 | 5/2002 | Stiles et al. | 719/313 |
| 6,484,169 | B1 * | 11/2002 | Wilsford | 707/6 |
| 6,609,106 | B1 | 8/2003 | Robertson | 705/26 |
| 6,629,097 | B1 * | 9/2003 | Keith | 1/1 |
| 6,745,190 | B2 | 6/2004 | Masuda et al. | 707/10 |
| 7,103,566 | B2 * | 9/2006 | Silva et al. | 705/26 |
| 7,130,814 | B1 * | 10/2006 | Szabo et al. | 705/26 |
| 7,424,445 | B1 * | 9/2008 | Cue et al. | 705/26 |
| 2001/0025271 | A1 * | 9/2001 | Allen | 705/65 |
| 2001/0034658 | A1 * | 10/2001 | Silva et al. | 705/26 |
| 2001/0039519 | A1 * | 11/2001 | Richards | 705/27 |
| 2002/0010623 | A1 | 1/2002 | McCollom et al. | 705/14 |
| 2003/0043144 | A1 * | 3/2003 | Pundarika et al. | 345/419 |
| 2003/0195877 | A1 * | 10/2003 | Ford et al. | 707/3 |
| 2007/0156529 | A1 * | 7/2007 | Walker et al. | 705/14 |
| 2008/0288372 | A1 * | 11/2008 | Cue et al. | 705/27 |

OTHER PUBLICATIONS

Jennings et al., "A Personal News Service Based on a User Model Neural Network," IEEE Transactions of Information Systems, N 2, Tokyo Mar. 1992, pp. 190-209.*

Markowitz, A., "Service Launches National Promo for Computerized Gift Registry," Discount Store News, Feb. 4, 1991.*

Nixon, D., "Merchandising Bridal Registry—75 Years of Bridal Business," Gift & Decorative Accessories, May 1992.*

Young, G., "Bridal Business Booming," Washington Post, 1985.*

Anon., "Electronic Retailing: A Competitive Edge," HFD—The Weekly Home Furnishings Newspaper, vol. 57, p. 22, Dec. 19, 1983.*

Kehoe, A.-M., "Technology Comes to Tabletop," HFD—The Weekly Home Furnishings Newspaper, vol. 67, No. 21, p. 45, May 24, 1993.*

Bernard, S., "Purchasing Bridal Gifts via the Net," HFD—The Weekly Home Furnishings Newspaper, vol. 69, No. 44, p. 31, Oct. 30, 1995.*

Reed, D., "Chart Surveyors," Marketing Week, vol. 18, No. 10, pp. 41-44, May 19, 1995.*

Anon., "Ethan Allen's Newest Website Feature Makes Shopping for Home Interiors Stress Free," Business Wire, Nov. 3, 1998.*

Levin, S., "A Woman's Weekly Guide to Cyberspace," Knight-Ridder Tribune Business News, Apr. 28, 1999.*

Harreld, H., "Its the Web, Stupid," Federal Computer Week, vol. 13, No. 38, pp. E4-E8, Nov. 15, 1999.*

Anon., "NowDocs.com Launches Breakthrough Print and Delivery Service in Canada; 2-Hour Delivery Debuts in Toronto," Business Wire, p. 1804, May 15, 2000.*

"Philip K.", "Reply to OSMatthew (Certitude, Commonsense, Fallacy of Composition, etc.)," posted in group alt.bible.errancy, Sep. 25, 1998.*

Jennings et al., "A Personal News Service Based on a User Model Neural Network," IEEE Transactions of Information Systems, N 2, Tokyo, Japan, Mar. 1992, pp. 190-209.

Markowitz, Arthur, "Service Launches National Promo for Computerized Gift Registry," Discount Store News, Feb. 4, 1991.

Nixon, Doris, "Merchandising Bridal Registry—75 Years of Bridal Business," Gift & Decorative Accessories, May 1992.

Young, Gale, et al., "Bridal Business Booming Industry Courting Two-Career Couples," The Washington Post, 1985.

Anon, "Electronic Retailing: A Competitive Edge," HFD—The Weekly Home Furnishings Newspaper, vol. 57, Dec. 19, 1983, p. 22.

Kehoe, "Technology Comes to Tabletop," HFD—The Weekly Home Furnishings Newspaper, May 24, 1993, p. 45.

Bernard, S., "Purchasing Bridal Gifts via the Net," HFN—The Weekly Newspaper for the Home Furniture Network, vol. 69, No. 44, Oct. 30, 1995, p. 31.

* cited by examiner

Item Categorization Information 140

| | Item Name | Item ID | Product/ Service | Product Type | Service Type | Occasion | Gender | Age Range | Interests |
|---|---|---|---|---|---|---|---|---|---|
| 140a | Book ABC | 0001342 | Product | Book | - | * | * | * | * |
| 140b | Book BCD | 0009287 | Product | Book | - | * | * | * | Science Fiction, Mystery |
| 140c X | Book CDE | 0001983 | Product | Book | - | * | Male | 16+ | * |
| 140d | Book DEF | 9072086 | Product | Book | - | Wedding | * | * | * |
| 140e | Cake ABC | 7972383 | Product | Food | - | Birthday | * | 5-10 | * |
| 140f | Food Product BCD | 2987238 | Product | Food | - | * | * | * | * |
| 140g | Flower Arrangement ABC | 0279800 | Product | Flowers | - | * | * | * | * |
| 140h | Music CD ABC | 0013803 | Product | Music, CD | - | * | * | * | * |
| 140i | DVD Movie ABC | 0012333 | Product | Movie, DVD | - | * | * | * | * |
| 140j | VHS Movie ABC | 7813292 | Product | Movie, VHS | - | * | * | * | * |
| 140k | TV ABC | 0974363 | Product | Electronics | - | * | * | * | * |
| 140l | Software ABC | 3513527 | Product | Software, CD | - | * | * | * | * |
| 140m X | Toy ABC | 4397234 | Product | Toy | - | * | * | * | * |
| 140n | Video Game ABC | 5982374 | Product | Video Game | - | * | * | * | * |
| 140o | Health Product ABC | 9874933 | Product | Health | - | * | * | * | * |
| 140p | Prescription ABC | 7283977 | Product | Health | - | * | * | * | * |
| 140q | Beauty Product ABC | 6387924 | Product | Beauty | - | * | * | * | * |
| 140r | Art Item ABC | 3941272 | Product | Art | - | * | * | * | * |
| 140s | Collectible Item ABC | 9071467 | Product | Collectible | - | * | * | * | * |
| 140t | Kitchenware ABC | 8913741 | Product | Kitchenware | - | * | * | * | * |
| 140u | Furniture ABC | 7137783 | Product | Furniture | - | * | * | * | * |
| 140v | Home Furnishing ABC | 8091203 | Product | Furnishing | - | * | * | * | * |
| 140w | Houseware ABC | 8789122 | Product | Houseware | - | * | * | * | * |
| 140x | Lawn Product ABC | 3293107 | Product | Lawn | - | * | * | * | * |
| 140y | Tool ABC | 2283717 | Product | Tool | - | * | * | * | * |
| 140z | Automobile ABC | 2002733 | Product | Automobile | - | * | * | * | * |
| 140aa | Automobile Rental ABC | 2002733 | Service | - | Rental | * | * | * | * |
| 140ab X | Home Cleaning Package ABC | 3229073 | Service | - | Cleaning | * | * | * | * |
| 140ac | Computer ABC & Service BCD | 4927349 | Product, Service | Computer | Repair | * | * | * | * |
| 140ad | Gift Certificate Amount ABC | 3789239 | Product | Gift Certificate | - | * | * | * | * |
| 140ae | Gift Cluster ABC | 9723078 | Product | Cluster | - | * | * | * | * |

Current Gift Cluster: Mom's Birthday Present 151   [Change Gift Cluster] 153   [Add Selected Items To Gift Cluster] 155

FIG. 1C

Create New Gift Clusters

| | | |
|---|---|---|
| * Name: | [　　　] | —162 |
| Description: | [　　　] | —164 |
| Available To Others: | Yes ▼ | —166 |
| Expiration: | None ▼ | —168 |
| Recipient: | <any> ▼ | —170 |
| Categories: | <any> ▼ | —172 |
| Occasion: | <any> ▼ | —174 |
| Education Level: | <any> ▼ | —176 |
| Gender: | male ▼ | —178 |
| Income level: | <any> ▼ | —180 |
| Age: | 18-20 ▼ | —182 |
| Location: | <any> ▼ | —184 |
| Interests: | <any> ▼ | —186 |
| Race: | <any> ▼ | —188 |
| Ethnicity: | <any> ▼ | —190 |
| Religion: | <any> ▼ | —191 |
| Occupation: | <any> ▼ | —192 |
| Sexual Orientation: | <any> ▼ | —193 |
| Gift Wrap: | None ▼ | —195 |
| Shipping Instructions: | None ▼ | —196 |
| Accompanying Card: | None ▼ | —197 |

160 — Create New Gift Cluster As Indicated

\* - Required Field

*FIG. 1D*

My Gift Clusters 220

| | Gift Cluster Name | Creator | Categories | Product/ Service | Available To Others | Expiration Date | Price | Gift Cluster Item Description | Cluster or Item ID | Occasion | Gender | Age Range | Interests |
|---|---|---|---|---|---|---|---|---|---|---|---|---|---|
| 220a | Mom's Birthday Present | User A | Book, Toy, Cleaning | Product, Service | Yes | - | $150 | | 0783412 | * | Male | 16+ | * |
| 220b | | | | | | | | Book CDE | 0001983 | * | Male | 16+ | * |
| 220c | | | | | | | | Toy ABC | 4397234 | * | * | * | * |
| 220d | | | | | | | | Home Cleaning Package ABC | 3229073 | * | * | * | * |
| 220e | Gift Cluster ABC | User A | Video Game | Product | No | 12/26/XX | $43 | | 5635655 | Christmas 2000 | * | 10-17 | * |
| 220f | | | | | | | | Video Game BCD | 7239472 | * | * | 5-17 | * |
| 220g | | | | | | | | Video Game CDE | 7239487 | * | * | 10-20 | * |
| | ... | | | | | | | | | | | | |

Current Recipient: Jan Smith ~231  [Change Recipient] ~233  [Buy Selected Gift Clusters For Recipient Now] ~235

FIG. 2A

Search For Gift Clusters

Name:  —302
 —352

Creator:  —304
 —354

Category:  —306
 —356

Occasion:  —308
 —358

Gender:  —310
 —360

Age:  —312
 —362

Interests:  —314
 —364

Maximum Price:  —316
 —366

Expiration:  —318
 —368

:  —322
—320

—370

Customer Categorization Information 390

| Customer Name | Customer ID | Gender | Age | Birthday | Interests | Occupation | Education Level | Income Level | Location | Race | Ethnicity | Religion | Sexual Orientation |
|---|---|---|---|---|---|---|---|---|---|---|---|---|---|
| John Doe | 2749328 | Male | 37 | - | - | - | - | - | - | - | - | - | - |
| Sally Hilter | 1234112 | Female | 13 | 04/22/XX | Baseball | - | - | - | - | - | - | - | - |
| Cowboy Joe | 1634132 | - | - | - | Dog Owner | - | - | - | - | - | - | - | - |
| Jose Smith | 1341311 | Male | 25 | 08/29/XX | Wine, Java | Architect | B.S. | 50-60K | Boston | - | Hispanic | Catholic | Heterosexual |
| ... | | | | | | | | | | | | | |

390a
390b
390c
390d

Current Gift Cluster: ABC  [Change Gift Cluster]  [Buy Gift Cluster For Selected Recipient Now]
381                        383                    385

*FIG. 3B*

PROVIDING GIFT CLUSTERING FUNCTIONALITY TO ASSIST A USER IN ORDERING MULTIPLE ITEMS FOR A RECIPIENT

CROSS REFERENCE TO RELATED APPLICATIONS

This application is a continuation of co-pending U.S. patent application Ser. No. 09/699,244 filed Oct. 27, 2000, which claims the benefit of provisional U.S. Patent Application No. 60/217,333 filed Jul. 11, 2000, and which is hereby incorporated by reference in its entirety.

TECHNICAL FIELD

The present invention relates to a computer method and system for placing orders, and more particularly to a method and system for ordering user-defined groups of multiple items.

BACKGROUND

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser (i.e., a special-purpose application program that effects the requesting of Web pages and the displaying of Web pages).

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to conducting electronic commerce. Many Web servers have been developed through which vendors can advertise and provide items. The item can be products that are delivered electronically to the purchaser over the Internet (e.g., music) and products that are delivered through conventional distribution channels (e.g., books delivered by a common carrier). Similarly, the items can be services that are provided either electronically (e.g., providing email service) or physically (e.g., performing cleaning services at the purchaser's house). While an orderer or purchaser of an item typically obtains full ownership of the item, other types of purchase transactions include renting, leasing, trying an evaluation copy of an item for free for a limited time, licensing, bartering, and exchanging.

A server computer system that is providing a item ordering or purchasing service may provide information about the available items using an electronic version of a catalog. A user (or "customer") may then use a browser to view and select various items in the catalog that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

The selection of the various items from the electronic catalogs is generally based on the "shopping cart" ordering/purchasing model. When the purchaser selects an item from the electronic catalog, the server computer system metaphorically adds that item to a shopping cart. When the purchaser is done selecting items, then all the items in the shopping cart can be "checked out" (i.e., ordered) when the purchaser provides billing and shipment information. In some models, when a purchaser selects any one item, then that item is "checked out" by automatically prompting the user for the billing and shipment information. Although the shopping cart model is very flexible and intuitive, it has a downside in that it requires many interactions by the purchaser. Thus, if a purchaser is ordering only one item, the overhead of confirming the various steps of the ordering process and waiting for, viewing, and updating the purchaser-specific order information can be significant. Also, sensitive information is transmitted over the Internet each time an order is placed using the shopping cart model, and thus is susceptible to being intercepted and decrypted.

Some Web sites also provide Web-based gift registry functionality (e.g., www<dot>wishclick<dot>com and www<dot>netgift<dot>com) in which a user can manually specify indications of items which they are interested in receiving, such as a "wish list" of desired items. Other users that desire to give a gift to that user can view the user's wish list, and then order or purchase an item from the list for the user. When using such wish lists, the gift recipient is more likely to receive appropriate gifts that they desire, and a gift giver is more likely to be able to provide such gifts to the recipient. Moreover, some Web sites may additionally track the items that gift givers purchase for the recipient, and automatically remove those items from the wish list when they are purchased.

Unfortunately, item ordering or purchasing services can be difficult to operate in certain circumstances. For example, if a user of such a service desires to send multiple items to a recipient, the user can manually specify the multiple items one-by-one (e.g., by placing all of the items in a shopping cart) and then order those items. However, item purchasing services will not typically treat the multiple items as a group—for example, some of the items may be shipped at different times if they have different availability or shipping needs. Even if an item purchasing service allows the user to indicate to ship all of the items together, the multiple items will not typically be treated as a group for other purposes such as pricing and availability (i.e., pricing and availability information will be presented separately for each individual item rather than for the group). In addition, if the user later desires to order the same multiple items (e.g., for a different recipient), the user will have to manually re-specify all of the items. This process can be time-consuming and frustrating.

Other problems with current item ordering or purchasing services relate to situations in which a user desires to order items for a recipient, but has difficulty in identifying appropriate items to order. For example, the user may be attempting to order items for a particular occasion (e.g., the birthday of the user's mother, or Easter), but have difficulty identifying items that would be of interest for the recipient on the occasion. Alternately, the user may know specific interests of the recipient (e.g., wine tasting, rock climbing, $18^{th}$ century French literature, etc.), but have difficulty identifying items that would be of interest to people with such interests. In other situations, the user may know only limited information about a potential recipient (e.g., only a username or an actual name) that does not include any information about the interests of the recipient.

BRIEF DESCRIPTION OF THE DRAWINGS

FIGS. 1A-1D illustrate an embodiment of creating user-defined gift clusters of multiple items to be later used for ordering.

FIGS. 2A-2B illustrate an embodiment of ordering user-defined gift clusters of multiple items.

FIG. 3B illustrates an embodiment of categorizing customers in a manner that can be used to identify user-defined gift clusters of multiple items that are appropriate for the customers.

DETAILED DESCRIPTION

Figure 1A:
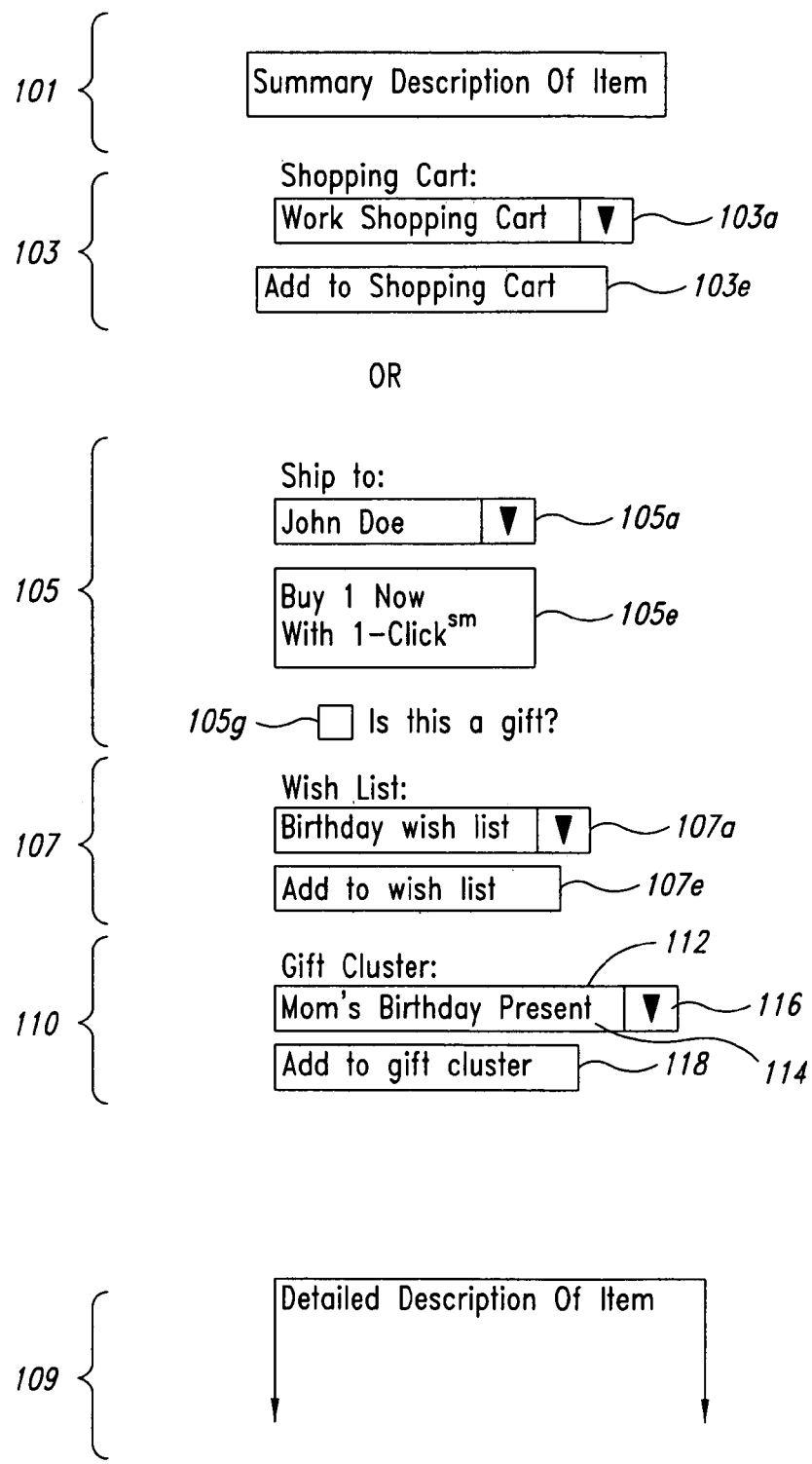

A software facility is described below for the creation (or "definition") of gift clusters of multiple items in a client/server environment, and for the ordering of such user-defined gift clusters of multiple items. In particular, a Gift Clustering system software facility allows a user to specify multiple items to be associated together as a gift cluster, and then to order the gift cluster as if it were a single item. In some embodiments the Gift Clustering system is provided by and works in conjunction with a particular item ordering service, while in other embodiments the system works independently from any particular item ordering service.

When creating or defining a gift cluster, the items added to the gift cluster can differ in various ways, such as having both items representing goods and items representing services, or having items of various product types (e.g., a book, a CD, a food product, etc.). In some embodiments, a gift cluster can even have an item that represents another gift cluster. Specific mechanisms for creating gift clusters are discussed in greater detail below.

After a user has created a gift cluster, the user can then order the gift cluster as if it were a single item (e.g., information about the ordering such as an availability or delivery date will be displayed for the gift cluster as a whole rather than for the individual items), and all of the multiple items associated with the gift cluster will be delivered as a group to the recipient of the order (e.g., the items will be shipped so as to arrive together). The user may order the gift cluster as a gift for themselves or for another recipient, and may also order the gift cluster for the same or different recipients multiple times.

When creating a gift cluster, a user can also specify a variety of descriptive information about the gift cluster. For example, the user may specify shipping instructions (e.g., next-day shipping) or wrapping instructions (e.g., a particular type of wrapping paper) that are appropriate for the items of the gift cluster. In addition, in some embodiments the user could specify a particular recipient or delivery address if the items are sufficiently specific to an intended recipient. Similarly, the user can in some embodiments specify information related to the user (e.g., if only the user will order the gift cluster), such as payment information associated with the user. When a gift cluster is ordered, such associated descriptive information will be used as part of the ordering unless overridden.

The user can also specify other descriptive information about a created gift cluster, such as whether the gift cluster is available only to the user for ordering or instead is also available to other customers. In some embodiments the user may indicate specific other customers to whom the created gift cluster will be available, while in other embodiments the created gift cluster will be available to any customer. In addition, in order to encourage users to create useful gift clusters and to make them available to others, the creators of gift clusters may in some embodiments be compensated for supplying gift clusters that are available to other users or for use of their supplied gift clusters by other customers. Other types of descriptive information that the user may specify about a gift cluster include an expiration date (e.g., after Christmas) or other criteria (e.g., a number of times of the gift cluster being ordered, such as 1) that when satisfied indicate that the gift cluster should be removed. When the expiration criteria are satisfied, the Gift Clustering system can remove (or make inaccessible) the gift cluster.

The user in some embodiments can also specify various descriptive information that categorizes the gift cluster so as to assist the user or others in identifying when the gift cluster is appropriate for a recipient. For example, the user may associate a mnemonic moniker with the gift cluster that will be used for display. In addition, the user may specify other categorization information for the gift cluster that indicates recipients or situations for which the gift cluster is appropriate. Such categorization could include identifying occasions for which the gift cluster is appropriate and/or identifying types of recipients for whom the gift cluster is appropriate. Types of recipients could be identified in a variety of ways, such as by interests of the recipients or by demographic information about the recipients.

The various categorization or other descriptive information can assist customers that are searching for appropriate gift clusters. In some embodiments, customers can specify an occasion and/or can identify various information about the intended recipient, and will then receive indications of various gift clusters that satisfy the specified criteria. In other embodiments, customers can use other criteria to search for gift clusters, such as popularity of the gift cluster (e.g., as defined by the number of orders that have been received for the gift cluster) or price, either alone or in combination with other criteria. If criteria such as popularity is to be used, the system can also track the use of the various created gift clusters in order to be able to determine such information.

In addition to the user-specified categorization discussed above, the system can in some embodiments automatically categorize user-defined gift clusters. This automatic categorization can occur in a variety of ways. For example, in some embodiments some or all individual items may have categorization information associated with them (e.g., a toy with a suggested age range or a gender-specific health product), and if so the categorization information for the items in a gift cluster could be combined to create an aggregate categorization for the gift cluster. Alternately, in other embodiments the system could track information over time about the recipients of a gift cluster (e.g., from information specified during searches or from user profiles for recipients), and could aggregate the information about the various past recipients in order to determine a categorization for the gift cluster to assist in identifying future recipients.

Similarly, the system can in some embodiments automatically search for appropriate user-defined gift clusters. For example, even if a customer does not know demographic information or interests of a possible recipient, the system may be able to access such information (e.g., from a user profile for the recipient, from past ordering patterns of the recipient, or from publicly accessible databases). If so, the system could receive an indication of a recipient, access relevant identifying or categorization information about the recipient, and automatically search for gift clusters that match the accessed information.

In other embodiments, the system may even be able to automatically create gift clusters. For example, the system could monitor groups of items that are ordered together by various customers. If enough customers order a group of items together, the system could automatically create a gift cluster containing those items.

Thus, gift clusters of multiple items can be created in a variety of ways, and can have a variety of types of associated information. In addition, the ability to create and order gift clusters provides a variety of benefits over current item ordering services.

Gift clusters can also be identified and ordered by customers in a variety of ways. In particular, gift clusters can be added to shopping carts and to wish lists in the same manner as any other item. In addition, in some embodiments a single-action ordering system is provided in which purchaser-specific order information is stored for a user and then used to complete an order for an item. Similarly, in some embodiments multi-procurement option ordering is provided in which multiple pre-defined alternatives with differing purchaser-specific order information are available for completing the ordering of the item. If single-action or multiple procurement option ordering systems are available, customers can use such systems to order gift clusters for themselves or for others in the same manner as for other items. Those skilled in the art will appreciate that other mechanisms for ordering or purchasing items can similarly be used to order or purchase gift clusters.

In one embodiment, the single-action ordering system involves the server system storing purchaser-specific order information for various potential purchasers. When a purchaser requests information describing an item, the server system can send the requested information (e.g., via a Web page) to the client computer system along with an indication of a single action to perform to place the order for the item. When single-action ordering is enabled, the purchaser need only perform a single action (e.g., click a mouse button) to order the item, and the server system then completes the order by adding the purchaser-specific order information for the purchaser to the item order information (e.g., product identifier and quantity).

In other embodiments, a mechanism for giving an item (including a gift cluster) as a gift to an identified recipient(s) using a single action is provided. When information is displayed describing the item, the system displays an instruction to identify the recipient(s) and then select a "give" button to order the item for the recipient(s). If the user is giving the gift to only one recipient, then the user enters identifying information, such as the email address, of the recipient. If the user is giving the gift to more than one recipient, the user could enter the identifying information of each recipient, or alternatively, the user could enter a group name that is associated with the identifying information for each member (i.e., recipient) of the group. The system then uses the identifying information to identify a delivery address for the gift, such as by searching accessible databases. Single-action ordering is discussed in greater detail in U.S. patent application Ser. No. 09/151,617, filed Sep. 11, 1998, which is hereby incorporated by reference in its entirety and which is a continuation-in-part of U.S. patent Ser. No. 09/046,503, filed on Mar. 23, 1998, now abandoned, and of U.S. patent application Ser. No. 08/928,951, filed on Sep. 12, 1997, U.S. Pat. No. 5,960,411.

In yet other embodiments, the multi-procurement option ordering system involves each user having multiple defined procurement options such that a selection or indication of one of those procurement options can be sufficient to complete the ordering of the item without further action by the user. Each procurement option can have a unique set of purchaser-specific order information (e.g., payment information, delivery address, delivery instructions, shipping instructions, wrapping instructions, etc.), can have a unique moniker (e.g., a short name such as "home," partial payment information, partial delivery address information, recipient name, etc.), and can have a variety of types of recipients (e.g., the user, an individual other than the user, a group of recipients, etc.) to whom an ordered item will be delivered. In some embodiments, each user can have one of their procurement options designated as their primary or default procurement option. Multi-procurement option ordering is discussed in greater detail in U.S. patent application Ser. No. 09/547,540, filed Apr. 12, 2000, which is hereby incorporated by reference in its entirety and which claims the benefit of provisional U.S. Patent Application No. 60/171,947, filed Dec. 23, 1999 and of U.S. Patent Application No. 60/190,264, filed Mar. 17, 2000.

FIGS. 1A-1D illustrate various example embodiments of creating user-defined gift clusters of multiple items that can be later used for ordering. In particular, FIG. 1A illustrates the display of an example Web page describing an available item, including a mechanism for adding the item to one or more gift clusters. This example Web page may be sent from a server system to a client system when a user of the client system requests to review detailed information about the item.

The example Web page contains a summary description section 101, a shopping cart section 103, an ordering section 105, a wish list addition section 107, and a detailed description section 109. These various sections 101-109 allow a user to take a variety of actions with respect to the described item. In particular, the summary and detailed description sections provide information that identifies and describes the item.

The shopping cart section allows the user to add the described item to one or more shopping carts. In particular, the shopping cart section includes a shopping cart option display 103a that indicates a currently selected shopping cart as well as a dropdown shopping cart selection button to select other shopping carts. The shopping cart section also contains a button 103e to use to add the described item to the currently selected shopping cart. In a similar manner, the wish list addition section allows the user to add the described item to one or more wish lists by using a wish list option display 107a that allows a current wish list to be selected and a button 107e that adds the described item to the currently selected wish list. The ordering section can be used for single-action ordering and multi-procurement option ordering of the described item. In particular, the user can select a current procurement option using the procurement option display 105a (if multiple procurement options are available for the user), and can order the described item using the information of the current procurement option with a single-action by selecting the button 105e (e.g., with a single click of the mouse button over the displayed indication of the button). The procurement option display may initially show a default procurement option, or may instead show only a single procurement option if only one is available. The ordering section also contains a gift indication selection option 105g that, if selected when the button 105e is selected, causes the system to gather additional information from the user such as whether a gift message will accompany (or precede) the item and whether to gift-wrap the item.

In addition to the sections 101-109, the example Web page also contains a gift cluster creation section 110 with which the user can add the described item to one or more gift clusters. In particular, the gift cluster creation section contains a gift cluster display 112, which includes a current gift cluster 114 and a gift cluster option selection button 116. The gift cluster creation section also contains an item addition button 118 that when selected will add the described item to the current gift cluster. In the illustrated embodiment, if there is more than one available gift cluster, a default gift cluster is initially selected as the current gift cluster when the Web page is first displayed. In other embodiments the system may allow only a single gift cluster to be created at a time. As is shown, a gift cluster with the moniker "Mom's Birthday Present" is the current gift cluster. When the item addition button is selected (e.g., by clicking the mouse when the cursor is over section 118), the client system sends a message to the server system requesting that the described item be added to the current gift cluster.

After the server system receives a message from the client system to add the item to the current gift cluster, the server system can then associate information about the item (e.g., a unique item ID) with the current gift cluster. In addition, in some embodiments the user may be able to specify quantity information for the item being added, either as part of the item description Web page or via an additional Web page (not shown) sent to the client system in response to the message. The server system may also send a new Web page (not shown) to the client system that confirms that the item has been added. The information about the gift clusters and their associated items can also be stored in a variety of ways. In some embodiments, the gift cluster information is stored by the server system and available to the client system only when the server system provides it to the client system, while in other embodiments the client system stores the gift cluster information and provides it to the server system.

Those skilled in the art will appreciate that the example Web page can be modified in a variety of ways. For example, Web pages on the server system may contain only the sections 101-109, and the gift cluster creation section may be selectively included or excluded before sending the Web page to the client system. Alternately, in some embodiments only a single shopping cart, wish list, procurement option, and gift cluster may be available or displayed on the Web page. Those skilled in the art will also appreciate that these various sections can be omitted or rearranged or adapted in various ways. The user need only be aware of the item to be added to a gift cluster and of an action (e.g., a single action) needed to add the item to the gift cluster.

Figure 1B:
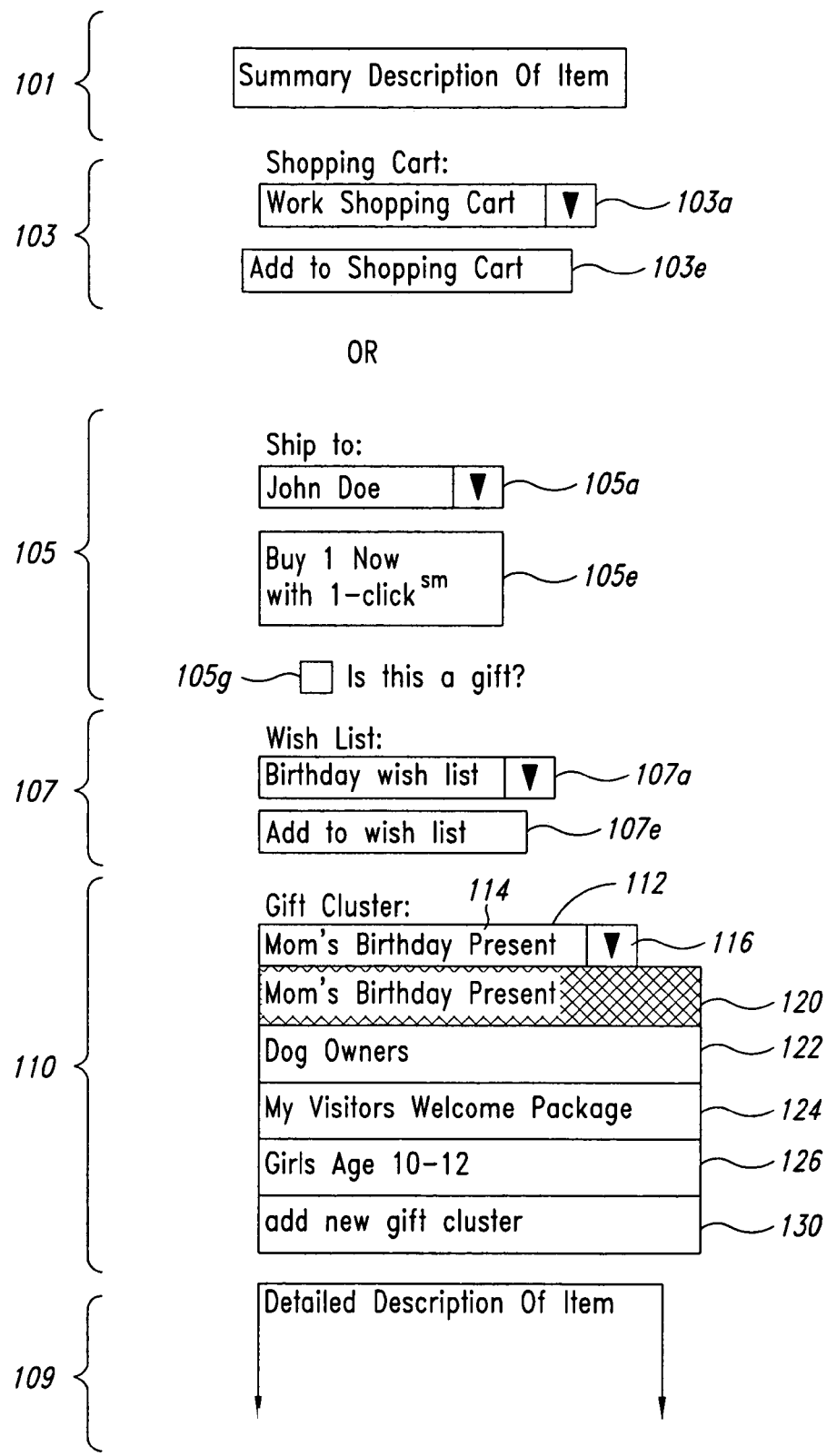

FIG. 1B illustrates the display of multiple gift cluster options available for selection by the current user. In the illustrated embodiment, a dropdown list of the available gift clusters is displayed after the receipt of a user indication (e.g., a left-click of the mouse while the cursor is over button 116). In addition to previously created gift clusters 120, 122, 124, and 126 that are displayed in the list, an option 130 to create a new gift cluster is also displayed. As is shown, some of the information on the Web page may be obscured by the dropdown list, such as the button 118. In alternate embodiments, available gift clusters may be displayed in a manner other than with a dropdown list. For example, the available gift clusters may instead be added to the Web page when it is initially generated, and thus be displayed without user indication. Alternately, available gift clusters can be displayed by cycling through and displaying a single entry at a time from a list of available gift clusters.

The gift clusters to be displayed can be determined in a variety of ways. In some embodiments, any gift cluster that the user has previously created may be displayed, while in other embodiments only certain gift clusters (e.g., those whose creation has not been completed) may be displayed. Alternately, some gift clusters (e.g., completed gift clusters) can be displayed in a manner that indicates that they are not available for selection (e.g., displayed in a dimmed manner or with an identifying mark).

The appearance of the displayed gift clusters can also vary in different ways. For example, the order and format in which the gift clusters are displayed can vary. In the illustrated embodiment, the list of gift clusters begins with the currently selected gift cluster (shown in highlighted form). In addition to order and format, the appearance of each individual gift cluster can also vary. For example, rather than displaying a moniker to represent a gift cluster, it is also possible to represent a gift cluster in other manners (e.g., when no moniker is defined) such as by displaying descriptive information about the gift cluster or information about some or all of the items in the gift cluster.

In the illustrated embodiment, the selection of an indicated displayed gift cluster causes that gift cluster to become the current gift cluster, but does not cause the item to be added to that gift cluster. Thus, for example, if gift cluster 122 with the moniker "Dog Owners" is selected, then that gift cluster will become the current gift cluster and the "Dog Owners" moniker will replace the moniker "Mom's Birthday Present" in the gift cluster display 112. If the user decides to then add the described item to the current gift cluster by selecting the button 118, the item will be added to the gift cluster 122.

If the user instead selects the "add new gift cluster" option 130, a new gift cluster will be created and selected as the current gift cluster. To begin the creation of the new gift cluster, the user may be presented with an additional Web page as illustrated in FIG. 1D for gathering information about the new gift cluster, such as a moniker, shipping instructions, whether to make the gift cluster available to others, and descriptive information such as categorization information.

In such an embodiment, the new gift cluster would be available for having items added to it after the gift cluster information is specified. Alternately, some or all of this information may be gathered later, such as after the creation of the new gift cluster is complete, and thus the new gift cluster may be available for having items added to it immediately after option 130 is selected.

In other embodiments, gift clusters can be created in other ways. For example, FIG. 1C illustrates an Item Categorization Information table 140 that contains various information about a wide variety of items. Each item has an entry 140a-140ae in the table, with the entry containing various information about the item in some or all of the fields. For example, entry 140a represents an item with an Item Name of "Book ABC" and a unique Item ID of "0001342." The book is categorized as a "Product" with a Product Type of "Book," and has no value for the Service Type field since it is not categorized as a service. The item is categorized as being appropriate for any occasion (indicated in the illustrative example with a "*" in the Occasion field), and similarly is appropriate for recipients of any Gender, Age Range, and Interests. Those skilled in the art will appreciate that a variety of other types of information about the items (e.g., price and availability) and about appropriate recipients for the items (e.g., religion and race) could also be displayed.

In addition to item "Book ABC," a variety of other available items are similarly displayed, including various food products (both packaged and prepared), flowers, music CDs, DVD and VHS movies, TVs, software, toys, video games, health products, medicine, beauty products, art and other collectibles, housewares and kitchenware, furniture and other home furnishings, tools and various lawn products, automobiles for purchase or rental, cleaning services, computers and associated services, gift certificates, and previously created gift clusters. Those skilled in the art will appreciate that a variety of other types of items could be displayed.

In addition to the fields containing item information, each item also has a selection box at the left end of its entry which may be selected by the user as part of a gift cluster being created. In particular, the selected items will be added to the Current Gift Cluster 151 displayed below the table, and in the illustrated embodiment the user can change the currently selected gift cluster by selecting the Change Gift Cluster button 153. After the current gift cluster and each of the items of interest are selected, the user can add the selected items to the gift cluster by selecting the Add Selected Items To Gift Cluster button 155. Those skilled in the art will appreciate that items can be displayed and selected for gift clusters in a variety of other ways.

FIG. 1D illustrates one method of supplying a variety of descriptive information about a gift cluster being created, regardless of whether it is created by selecting option 130 in FIG. 1B or in some other manner. In the illustrated embodiment, the user is required to select a name moniker 162 for the gift cluster, and can optionally select a variety of types of other information. The other information includes a Description 164, an indication of whether the gift cluster is to be Available To Others 166, Expiration criteria 168, and one or more Recipients 170, Categories 172, Occasions 174, Education Levels 176, Genders 178, Income Levels 180, Ages (or age ranges) 182, geographic Locations 184, Interests 186, Races 188, Ethnicities 190, Religions 191, Occupations 192, Sexual Orientations 193, Gift Wraps 195, Shipping Instructions 196, and Accompanying Cards 197. For some types of information the user may select from a dropdown list (e.g., Available To Others), while for other types of information the user may enter freeform text (e.g., Description). After all of the information of interest has been specified, the user can associate the specified information with the gift cluster being created by selecting the Create New Gift Cluster As Indicated button 160. Those skilled in the art will appreciate that any type of information describing an item or how an item can be appropriately used (including appropriate occasions and recipients for the item) could similarly be specified for the gift cluster, and that in some embodiments a Name moniker may not be required.

After one of more gift clusters have been created, such gifts clusters can be used for purchasing multiple items for a recipient as a group. FIGS. 2A-3B illustrate various embodiments of identifying and purchasing appropriate user-defined gift clusters of multiple items. In particular, FIG. 2A illustrates one method in which a user can view gift clusters which they have previously created and can order one or more of those gift clusters for a recipient. The previously created gift clusters are displayed (e.g., in response to a user request) in a My Gift Clusters table 220 that contains various information about the gift cluster. Each gift cluster has an entry in the table that contains information about the gift cluster, and also has a sub-entry in the table for each item in the gift cluster.

Thus, for example, the gift cluster with the moniker "Mom's Birthday Present" is represented by entry 220a in the table, and the three items selected in FIG. 1C to be added to the gift cluster are represented by sub-entries 220b-220d. These sub-entries contain the item information illustrated in FIG. 1C, whether copied from or linked to the Item Categorization Information table. This gift cluster is indicated to be Accessible To Others (e.g., whether specifically indicated by the user or as a default for newly created gift clusters), to currently have no Expiration Date or other expiration criteria, and to have a price of $150 for all of the items in the gift cluster. No description information is available for the gift cluster, but it does have a unique cluster ID. In addition, the gift cluster has a variety of categorization information associated with it. In the illustrated embodiment, the categorization information of the various items in the gift cluster is automatically combined to create a set of categorization information for the gift cluster that is consistent with the items. In some embodiments, the user may be able to manually modify some or all of the automatically generated descriptive information associated with the gift clusters, while in other embodiments all descriptive information about the gift clusters may instead be manually supplied. Gift cluster ABC, represented by entry 220e and sub-entries 220f-220g similarly has various associated information in the table.

In addition to the other fields, each gift cluster entry in the table also has a selection box at the left end of its entry which may be selected by the user. In addition, a Current Recipient 231 is displayed below the table, as well as a Change Recipient button 233. After a current recipient and one or more gift clusters of interest are selected, the user can order the selected gift clusters for the selected recipient by selecting the Buy Selected Gift Clusters For Recipient Now button 235. Those skilled in the art will appreciate that gift clusters can be displayed and selected for ordering for a recipient in a variety of other ways.

Figure 2B:
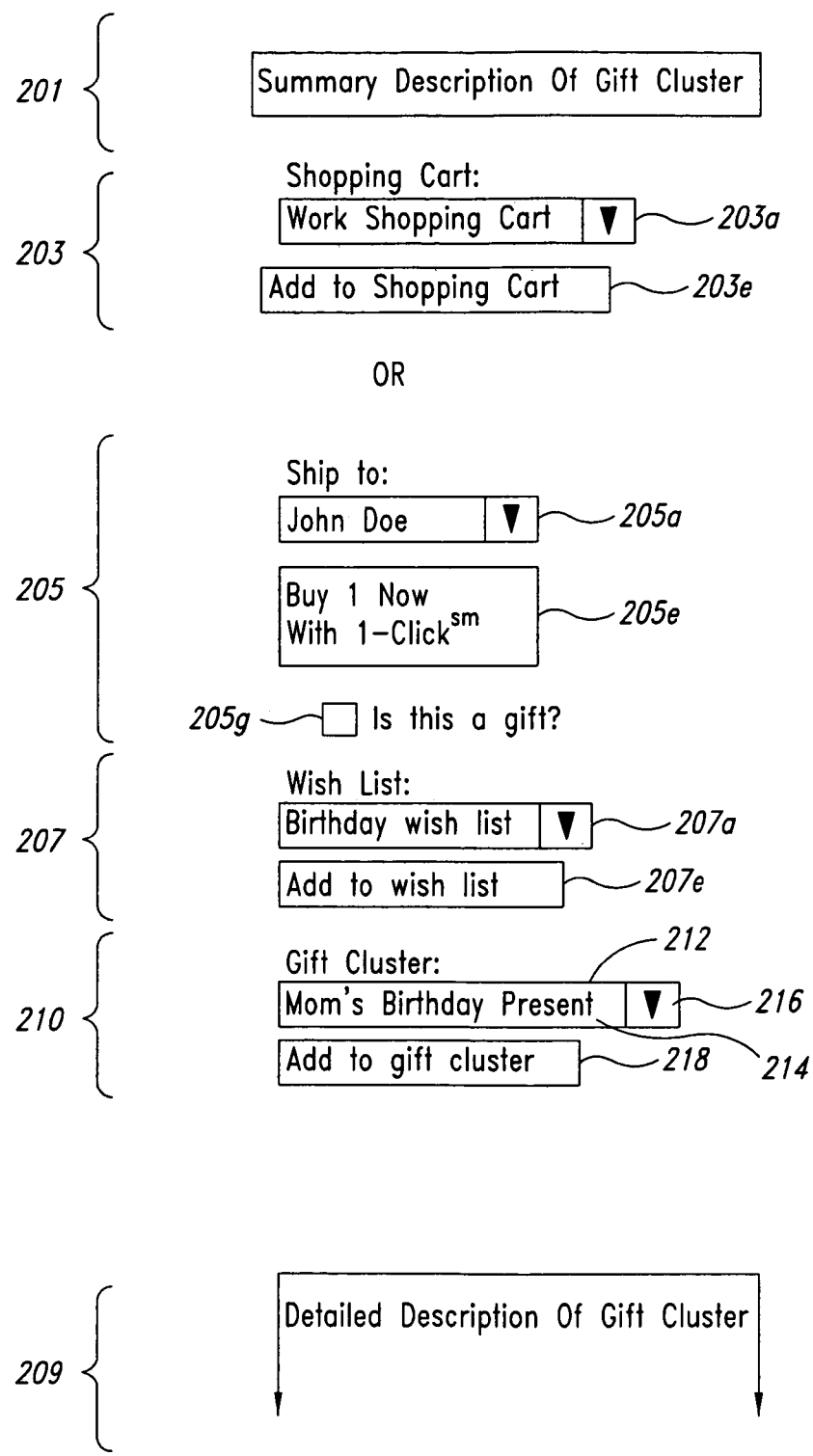

Rather than ordering gift clusters from a display of multiple gift clusters such as in table 220, a user may instead be able to order an available gift cluster from an Web page describing the gift cluster, an example of which is illustrated in FIG. 2B. This example Web page may be sent from a server system to a client system when a user of the client system requests to review detailed information about a gift cluster.

The example Web page contains a summary description section 201, a shopping cart section 203, an ordering section 205, a wish list addition section 207, and a detailed description section 209. These various sections 201-209 allow a user to take a variety of actions with respect to the described gift cluster. In particular, similarly to the item description Web page illustrated in FIG. 1A, the summary and detailed description sections provide information that identifies and describes the gift cluster (e.g., information about the various items in the gift cluster and/or various categorization information about the gift cluster). The shopping cart section allows the user to add the described gift cluster to one or more shopping carts by selecting a current shopping cart with the shopping cart option display 203a and adding the gift cluster to the current shopping cart with button 203e. In a similar manner, the wish list addition section allows the user to add the described gift cluster to one or more wish lists by using a wish list option display 207a that allows a current wish list to be selected and a button 207e that adds the described gift cluster to the currently selected wish list. The ordering section can also be used in a manner similar to that described with respect to FIG. 1A for single-action ordering and multi-procurement option ordering of the described gift cluster for a specified recipient. In addition to the sections 201-209, the example Web page also contains a gift cluster creation section 210 with which the user can add the described gift cluster to one or more other gift clusters.

After the server system receives a message from the client system to perform one of the indicated actions for the described gift cluster (e.g., order the gift cluster for a specified recipient), the server system can then perform the requested action. The server system may also send a new Web page (not shown) to the client system that confirms that the action has been taken.

Those skilled in the art will appreciate that this example Web page can be modified in a variety of ways. For example, in some embodiments only a single shopping cart, wish list, procurement option, and gift cluster may be available or displayed on the Web page. Those skilled in the art will also appreciate that the various displayed sections can be omitted or rearranged or adapted in various ways. The user need only be aware of the gift cluster and of the recipient, and of an action (e.g., a single action) needed to order the gift cluster for the recipient.

Figure 3A:
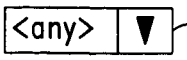
FIG. 3A illustrates an embodiment of searching for user-defined gift clusters of multiple items that satisfy specified search criteria.
Figure 3A:
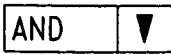
Figure 3A:
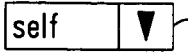
Figure 3A:
Figure 3A:
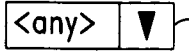
Figure 3A:
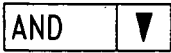
Figure 3A:
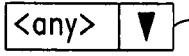
Figure 3A:
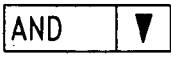
Figure 3A:
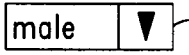
Figure 3A:
Figure 3A:
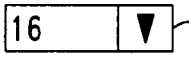
Figure 3A:
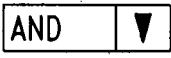
Figure 3A:
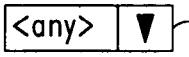
Figure 3A:
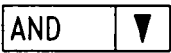
Figure 3A:
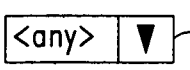
Figure 3A:
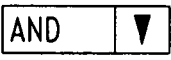
Figure 3A:
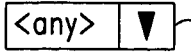
Figure 3A:
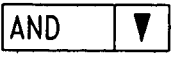
Figure 3A:
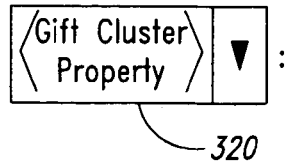
Figure 3A:
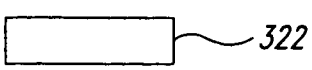
Figure 3A:
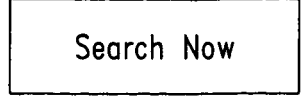

In addition to a user being able to display the various gift clusters that the user has previously created, the user may also be able to identify various gift clusters which match specified criteria, whether they were created by the user or by others. In particular, FIG. 3A illustrates one embodiment in which a user can specify various criteria, and can search for and retrieve various gift clusters which match the specified criteria.

In the illustrated embodiment, the user can specify search criteria for one or more categorization information types 302-322, and can also specify logical connectors (e.g., AND, OR, NOT, etc.) 352-368 which determine how multiple search criteria are combined when searching. The categorization information types include a gift cluster Name 302, user Creator 304, Category 306 (e.g., any service, or a particular product such as a book), Occasion 308, Gender 310, Age 312, Interests 314, Maximum Price 316, and Expiration criteria 318, and for each of these categories the user can select an appropriate value. The categorization information types also include category type 320 which allows the user to select any of a number of gift cluster properties, and to specify a value for the property in field 322. For some types of information the user may select from a dropdown list, while for other types of information the user may enter freeform text. After all of the search criteria of interest has been specified, the user can search for gift clusters that match the search criteria by selecting the Search Now button 370. If the user had specified criteria indicating, for example, an Occasion of "Christmas," a Gender of "Male," and an Age of 17, both of the gift clusters illustrated in FIG. 2A would match the specified criteria. However, unless the user performing the search was the same user that created the two gift clusters, only the gift cluster represented by entry 220a will be presented to the searching user since the other gift cluster is not Accessible To Others.

Those skilled in the art will appreciate that any type of information describing a gift cluster or how a gift cluster can be appropriately used (including appropriate occasions and recipients for the gift cluster) could be specified as search criteria. In addition, gift clusters that are identified as matching the specified search criteria can be displayed to the user performing the search in a variety of ways, such as in a table similar to table 220 illustrated in FIG. 2A or in multiple descriptive gift cluster Web pages such as is illustrated in FIG. 2B.

In an alternate embodiment, a user may be able to identify various gift clusters which are appropriate for a particular recipient, even if the user does not have other relevant information about the user. For example, the system may maintain or have access to various information about the recipient which can be automatically identified and used as search criteria. In some embodiments the information will be displayed to the user, and the user can then use the customer information to perform a search. In other embodiments, such information about the user may not itself be displayed to the user, but the information can be automatically used to perform a search, and the results of the search will be displayed to the user.

FIG. 3B illustrates an embodiment in which various information about multiple customers is stored and can be used as search criteria. In particular, FIG. 3B illustrates a Customer Categorization Information table 390 that contains various information about customers. Each customer has an entry 390a-390d in the table, with the entry containing various information about the customer in some or all of the fields. For example, entry 390a represents customer John Doe who has a unique Customer ID of "2749328." Mr. Doe is Male and has an age of 37, but other information about Mr. Doe such as his Birthday, Interests, Occupation, Education Level, Income Level, Location, Race, Ethnicity, Religion and Sexual Orientation is not available. For other customers such as the person represented by entry 390c, the actual name of the user may not even be available, with only a username or screenname instead being used. Those skilled in the art will appreciate that a variety of other types of information about the customers could also be stored and displayed.

In addition to being able to use the information in the table as search criteria (whether automatically or manually), the table in the illustrated embodiment can also be displayed to the user and used for specifying recipients of a gift cluster being ordered. In particular, each customer entry in the table has a selection box at the left end of its entry which may be selected by the user. A Current Gift Cluster 381 is also displayed below the table, as well as a Change Gift Cluster button 383. After a current gift cluster and one or more recipients of interest are selected, the user can order the current gift cluster for the selected recipients by selecting the Buy Gift Cluster For Selected Recipient Now button 385.

Those skilled in the art will appreciate that the embodiments shown in FIGS. 1A-3B are for illustrative purposes only, and are not intended to limit the scope of the invention.

A user can perform a creation of a gift cluster of multiple items in a variety of ways, and can similarly perform an identification of an appropriate gift cluster or an ordering of a gift cluster in a variety of ways.

Figure 4:
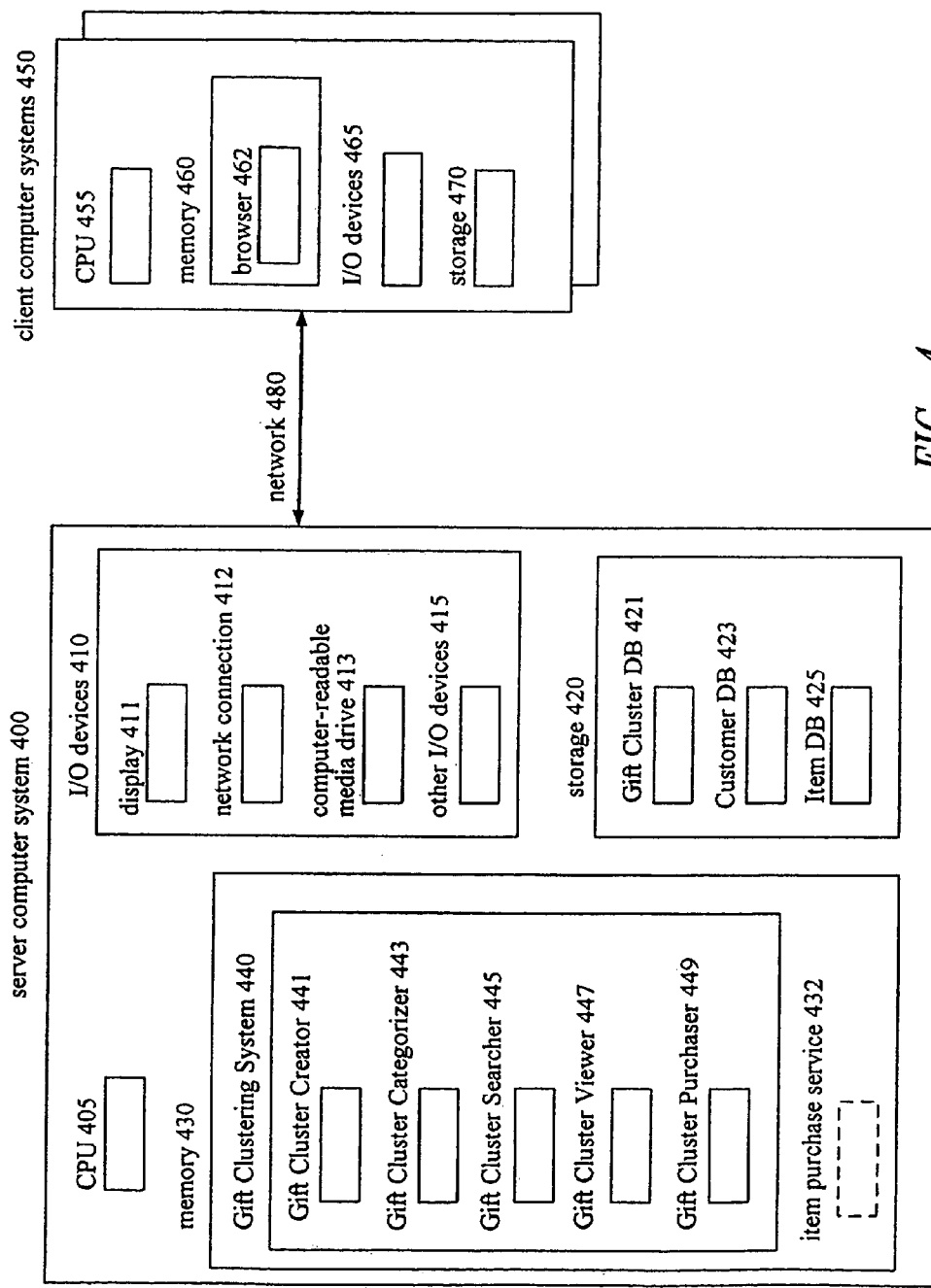
FIG. 4 is a block diagram illustrating an embodiment of a system for creating and ordering user-defined gift clusters of multiple items.

FIG. 4 is a block diagram illustrating a server computer system 400 suitable for executing an embodiment of the Gift Clustering system, and client computer systems 450 from which users can access functionality related to gift clusters. The server computer system includes a CPU 405, various I/O devices 410, storage 420, and memory 430. The I/O devices include a display 411, a network connection 412, a computer-readable media drive 413, and other I/O devices 415.

An embodiment of the Gift Clustering system 440 is executing in memory, and it includes a Gift Cluster Creator component 441, a Gift Cluster Categorizer component 443, a Gift Cluster Searcher component 445, a Gift Cluster Viewer component 447, and a Gift Cluster Purchaser component 449. In some embodiments, the Gift Clustering system will operate in conjunction with an optional item purchasing or ordering service 432 that can be executing on another computer system or on the server system 400.

Users can access the Gift Clustering system in a variety of ways. For example, some users may have physical access to the server computer system. Alternately, other users can use client computer systems to remotely access the system (e.g., via the Internet and/or the World Wide Web). Such users can use software or other functionality provided on the client computer systems, such as a browser 462 executing in memory 460, to interact with the Gift Clustering system. In addition, some or all of the Gift Clustering components may provide various feedback or other general types of information to users (e.g., in response to user requests), and this information can be presented to the user on the display 411 of the server system or on one of the I/O devices 465 on a client system.

As the Gift Clustering system executes, the Gift Cluster Creator component receives requests from users to create gift clusters of multiple items and in response creates the gift clusters. In particular, the Gift Cluster Creator component may receive an indication to create a new gift cluster, and optionally may obtain various categorization information to be associated with the new gift cluster and/or various other descriptive information about the gift cluster. After a new cluster is initially created, various items can be added to the gift cluster by indicating the items (and the gift cluster if more than one is being created) to the Gift Cluster Creator component. After the new gift cluster is created, the gift cluster and its associated information (including the items added to the gift cluster and the other descriptive information) are stored in the Gift Cluster database 421 on storage 420.

The Gift Cluster Categorizer component categorizes created gift clusters to assist in later identification of appropriate gift clusters, such as when searches are conducted. If the Gift Cluster Creator component received categorization information for a newly created gift cluster from the user, the Gift Cluster Creator component supplies the categorization information to the Gift Cluster Categorizer component. In some embodiments the Gift Cluster Categorizer component will categorize the created gift cluster using manually specified information, whether received from the Gift Cluster Creator component or directly from the user. To assist the user in manually categorizing the created gift cluster, the Gift Cluster Categorizer component can supply information to the user that identifies possible categorization types and/or possible values for categorization types, and in return receive categorization information.

In other embodiments, the Gift Cluster Categorizer component will automatically categorize the created gift cluster. As described previously, this can be done in a variety of ways, such as by aggregating item categorization information for the items in the gift cluster (e.g., from the Item database 425 on storage 420) or by tracking recipients of the gift cluster and aggregating customer categorization information (e.g., from the Customer database 423 on storage 420) for the recipients. After the gift cluster is categorized, its associated categorization information is stored in the Gift Cluster database and is associated with the gift cluster.

The Gift Cluster Searcher component assists users in searching for appropriate gift clusters. For example, the Gift Cluster Searcher component can allow a user to specify various categorization criteria (e.g., an occasion and/or various information about the intended recipient), and will then determine various gift clusters that satisfy the specified criteria (e.g., by using information in the Gift Cluster database) and indicate them to the user.

The Gift Cluster Viewer component displays one or more indicated gift clusters to a user in a variety of ways. The component can retrieve a variety of information about the gift clusters from the gift cluster database, and send the retrieved information (e.g., as part of a Web page) to the user for display.

The Gift Cluster Purchaser component allows a user to order one or more gift clusters as if they were a single item for one or more recipients. The user may order the gift cluster as a gift for themselves or for another recipient, and may also order the gift cluster for the same or different recipients multiple times. The user can indicate the gift clusters and recipients in a variety of ways.

Those skilled in the art will appreciate that computer systems 400 and 450 are merely illustrative and are not intended to limit the scope of the present invention. For example, the functionality provided by the illustrated components may in some embodiments be combined in fewer components or distributed in additional components, such as having separate components that determine pricing and/or availability information for a gift cluster rather than including this functionality in another component such as the Gift Cluster Purchaser. In addition, while items 440-449 and 432 are illustrated as being stored in memory while being used, those skilled in the art will appreciate that these items, or portions of them, can be transferred between memory and other storage devices for purposes of memory management and data integrity. Similarly, while items 421-425 are illustrated as being present on storage while being used, those skilled in the art will appreciate that these items, or portions of them, can instead be present in memory and transferred between storage and memory. Alternately, in other embodiments some or all of the software components or systems may execute in memory on another device, and communicate with the Gift Clustering system via inter-computer communication. The Gift Clustering system may be stored as instructions on a computer-readable medium, such as a hard disk, a memory, or a portable article to be read by an appropriate drive. Similarly, the data structures of the Gift Clustering system may also be stored on a computer-readable medium. Moreover, the Gift Clustering system instructions and data structures can also be transmitted as generated data signals on a variety of computer-readable transmission mediums, including wireless-based and wired/cable-based mediums. In addition, the computer systems may contain additional components not shown (e.g., various standard I/O devices) or may lack some illustrated components, and the computer system 400 may be connected to other devices, including through a network, through the Internet, or via the World Wide Web (WWW). Accordingly, the present invention may be practiced with other computer system configurations.

In some embodiments, a client system communicates with the server system in order to send HTTP requests and receive Web pages from the server. The client system can use a browser to send and receive HTTP messages and to display Web pages. One skilled in the art will appreciate that the techniques of the Gift Clustering system can be used in various environments other than the Internet. For example, the techniques can also be used in an electronic mail environment in which a gift cluster is described in an electronic mail message along with an indication of a recipient so as to ordering the gift cluster for the recipient. Also, various communication channels may be used, such as a local area network, a wide area network, or a point-to-point dialup connection. In addition, a server system may comprise any combination of hardware or software that can generate orders in response to selection of a gift cluster and a recipient. Similarly, a client system may comprise any combination of hardware or software that can interact with the server system. These systems may include television-based systems or various other consumer products through which orders may be placed. In addition, while Web pages are often constructed using HTML, other methods can be used to create such pages, such as Java, XML, HDML, WML, CGI scripts, etc. Similarly, communication protocols other than HTTP can be used, such as WAP, TCP/IP, or FTP, as well as a variety of inter-device communication mechanisms, including CDPD, CDMA, GSM, PDC, PHS, TDMA, FLEX, ReFLEX, iDEN, TETRA, DECT, DataTAC, Mobitex, etc. Both the client and the server system can also operate on a wide variety of operating system types (e.g., Windows, Linux, Unix, MacOS, BEOS, PalmOS, EPOC, Windows CE, FLEXOS, OS/9, JavaOS, etc.), and need not share the same operating system.

Figure 5A:
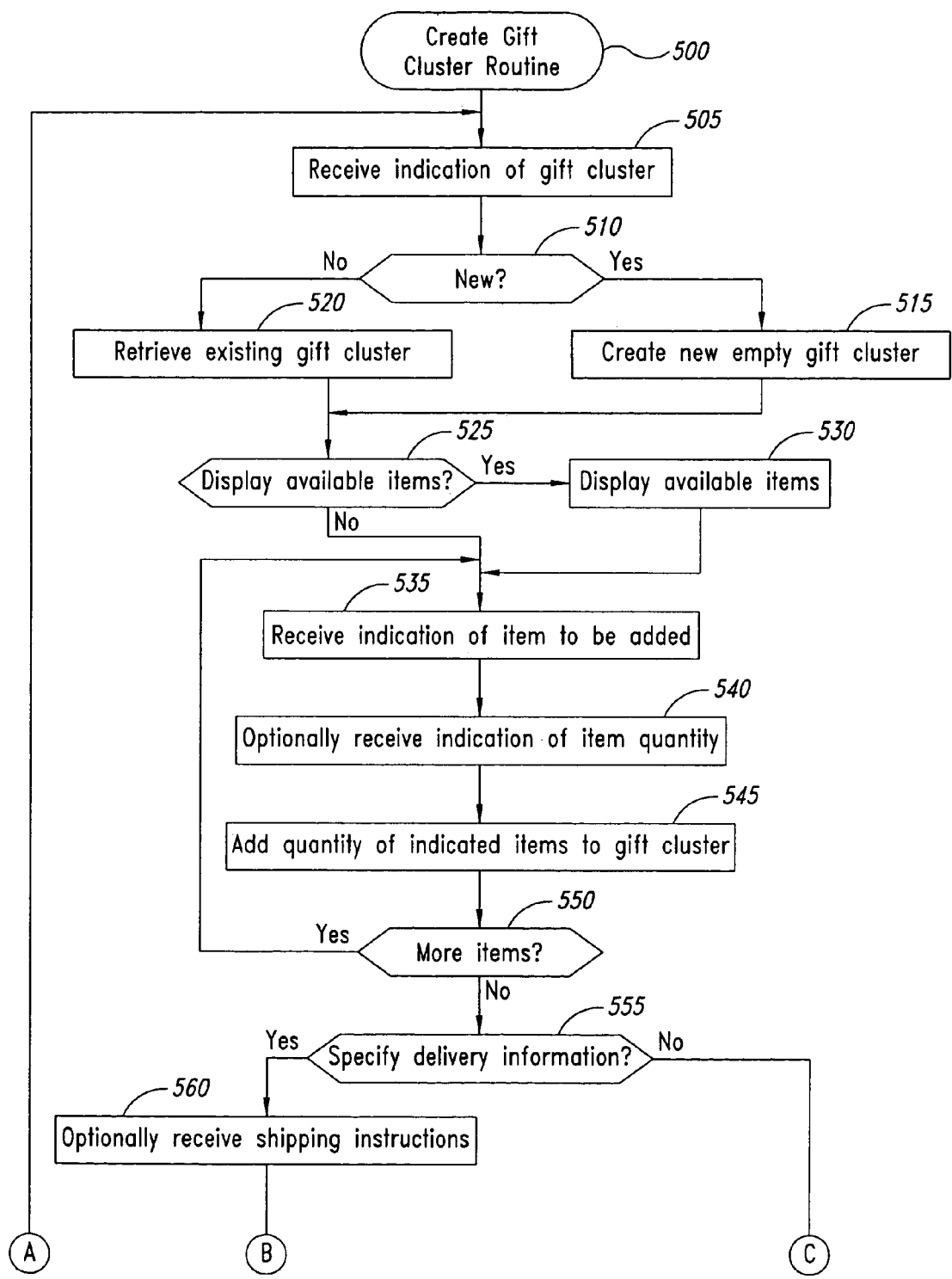
FIG. 5 is a flow diagram of an embodiment of the Create Gift Cluster routine.
Figure 5B:
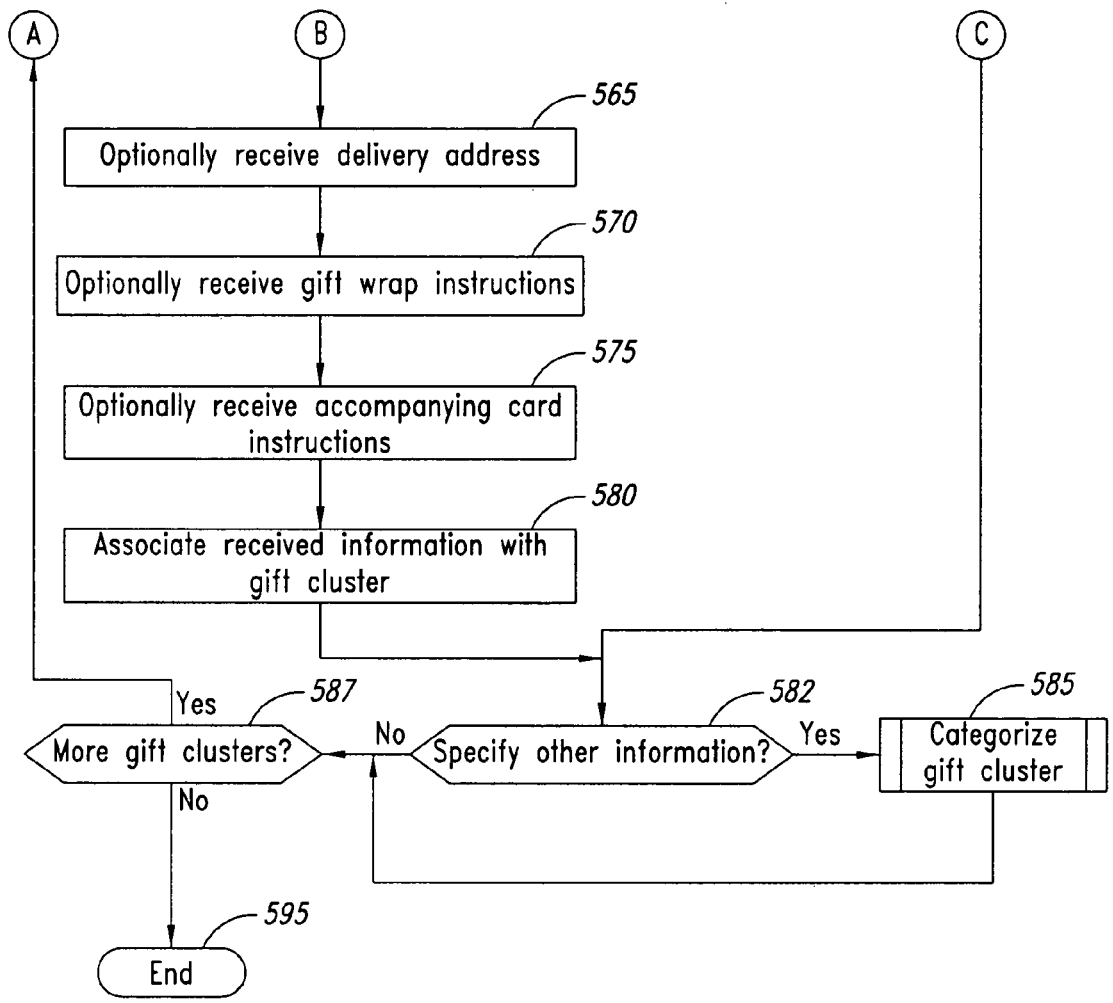

FIG. 5 is a flow diagram of an embodiment of the Create Gift Cluster routine 500. The routine receives an indication of a gift cluster to be created, adds various items to the gift cluster, and optionally receives various descriptive information about the gift cluster and associates that information with the gift cluster. The routine begins in step 505 where an indication of the gift cluster to be created is received. The routine then continues to step 510 to determine if the indicated gift cluster is a new gift cluster or an existing gift cluster. If new, the routine continues to step 515 to create a new empty gift cluster, and if not the routine continues to step 520 to retrieve information about the existing gift cluster (e.g., from the Gift Cluster database).

After steps 515 or 520, the routine continues to step 525 to determine if available items that can be added to the gift cluster are to be displayed, and if so continues to step 530 to display the available items. After step 530, or if available items are not to be displayed, the routine continues to step 535 to receive an indication of an item to be added to the gift cluster. In step 540, the routine then optionally receives an indication of a quantity of the item, which in some embodiments may default to a specified quantity such as 1 if another quantity is not indicated. The routine then continues to step 545 to add the indicated item in the indicated quantity to the gift cluster. After step 545, the routine continues to step 550 to determine if more items are to be added to the gift cluster, and if so returns to step 535.

If additional items are not to be added to the gift cluster, the routine continues to step 555 to determine if descriptive delivery-related information is to be specified for the gift cluster. If so, the routine continues to step 560 to optionally receive shipping instructions. In step 565, the routine then optionally receives a delivery address, and in step 570 optionally receives gift wrap instructions. The routine next optionally receives accompanying card instructions in step 575, and in step 580 associates the various received information with the gift cluster. After step 580, or if it was determined in step 555 that information was not to be specified, the routine continues to step 582 to determine if descriptive categorization information about the gift cluster is to be specified. If so, the routine continues to step 585 to execute the Categorize Gift Cluster routine. After step 585, or if it was instead determined in step 582 that other information was not to be specified, the routine continues to step 587 to determine if more gift clusters are to be created. If so, the routine returns to step 505, and if not the routine continues to step 595 and ends.

Figure 6:
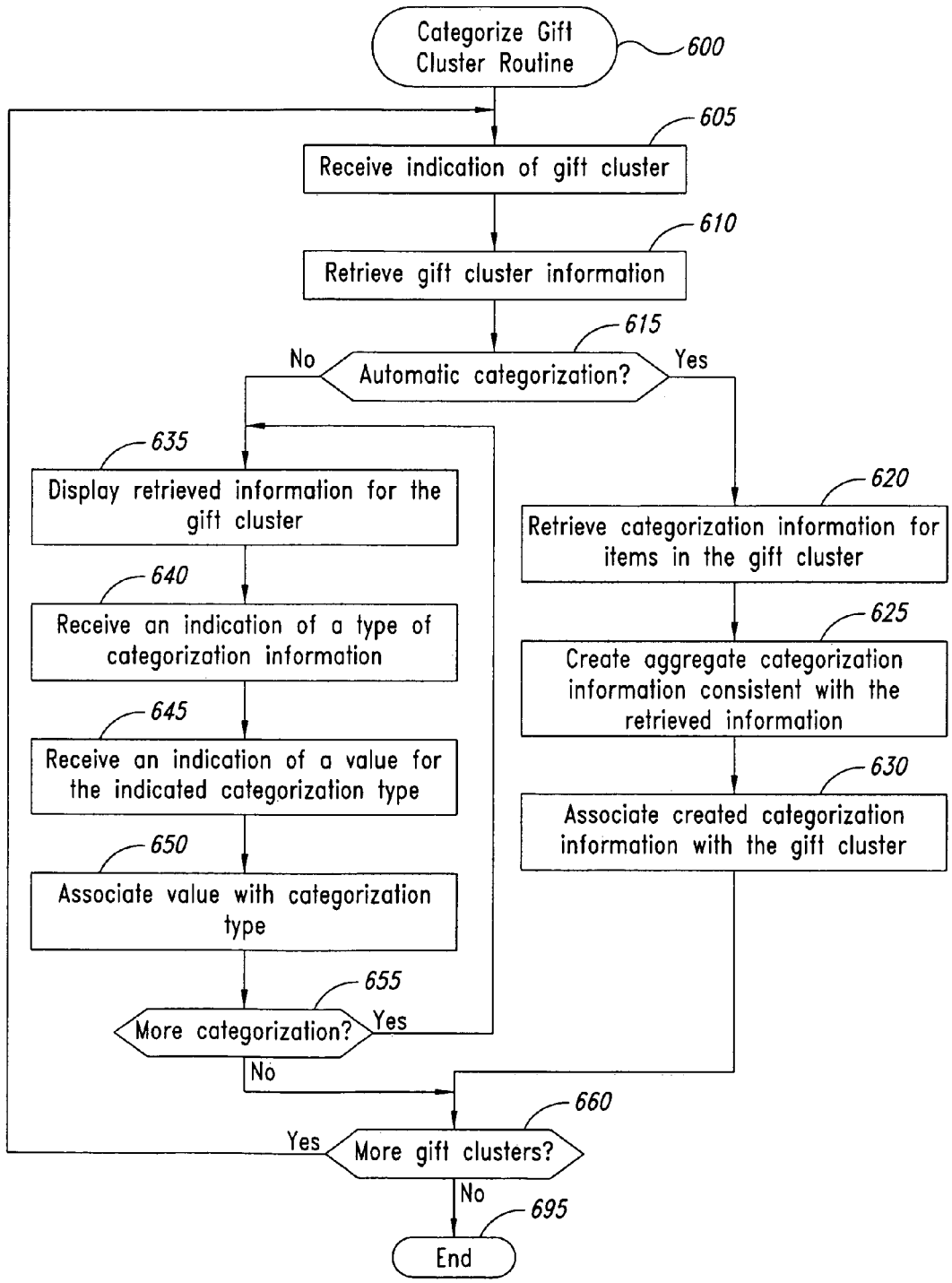
FIG. 6 is a flow diagram of an embodiment of the Categorize Gift Cluster routine.

FIG. 6 is a flow diagram of an embodiment of the Categorize Gift Cluster routine 600. The routine receives various categorization information about an indicated gift cluster, and associates the information with the gift cluster. The routine begins in step 605 where an indication of a gift cluster is received. The routine next continues to step 610 to retrieve various information about the gift cluster, such as from the Gift Cluster database. In step 615, the routine next determines if the gift cluster is to be automatically or manually categorized. If automatic categorization is to occur, the routine continues to step 620 to retrieve categorization information about items in the gift cluster. The routine then continues to step 625 where it creates aggregate categorization information that is consistent with the retrieved categorization information. In step 630, the created aggregate categorization information is then associated with the gift cluster. Those skilled in the art will appreciate that other types of automatic generation of categorization information can occur.

If it was instead determined in step 615 that manual categorization was to occur, the routine instead continues to step 635 where it displays the information about the gift cluster that was retrieved in step 610. The routine next continues to step 640 where a receives an indication of a type of categorization information from the user, and in step 645 receives an indication of a value for the categorization type. In step 650 the routine then associates the categorization type and value with the gift cluster, and then continues to step 655 to determine if more manual categorization is to occur for the gift cluster. If so, the routine returns to step 635, and if not or after step 630, the routine continues to step 660 to determine if more gift clusters are to be categorized. If so, the routine returns to step 605, and if not the routine continues to step 695 and ends.

Figure 7:
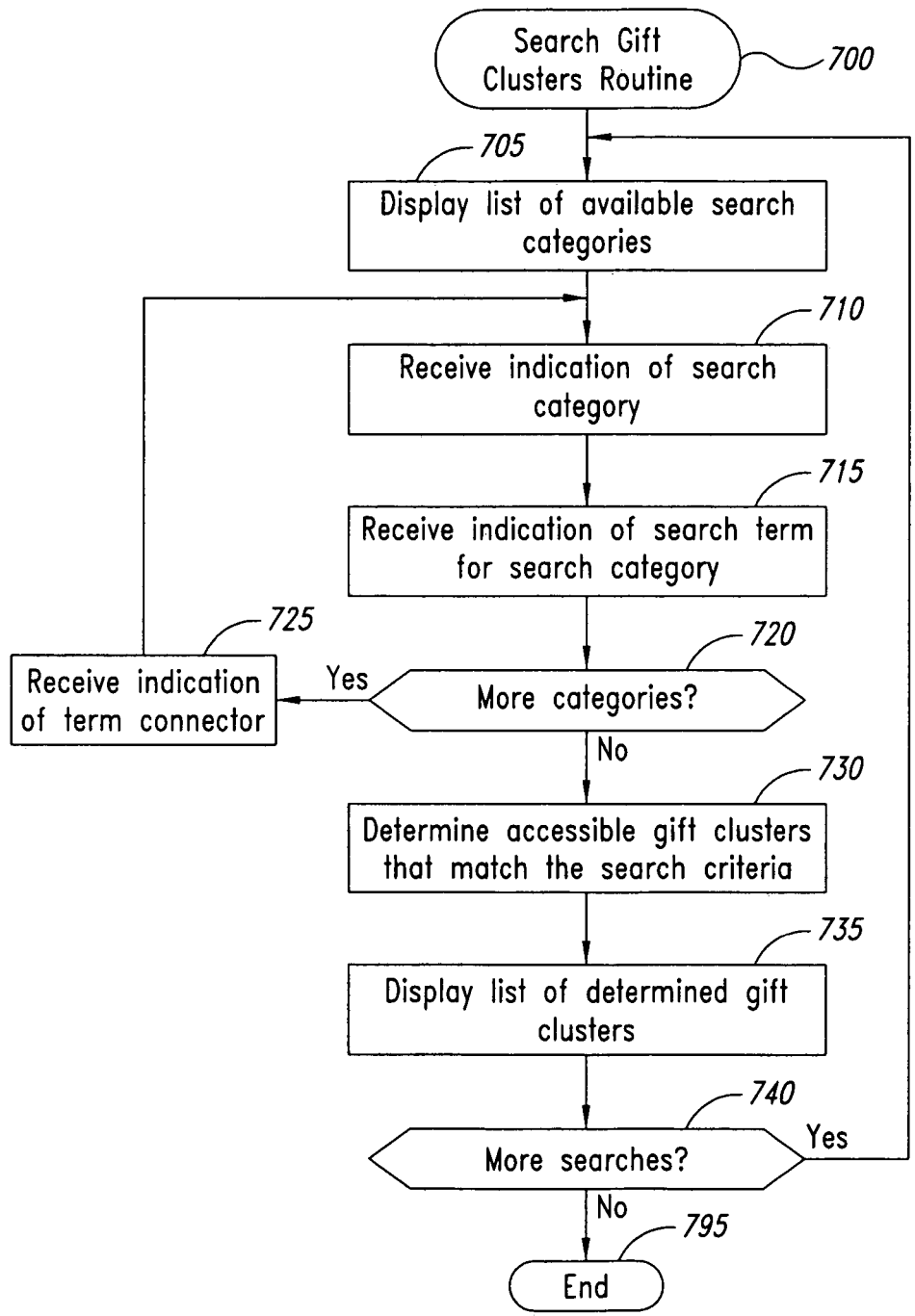
FIG. 7 is a flow diagram of an embodiment of the Search Gift Clusters routine.

FIG. 7 is a flow diagram of an embodiment of the Search Gift Clusters routine 700. The routine receives indications of various search criteria from a user, determines gift clusters that match the search criteria, and display indications of the gift clusters to the user. The routine begins in step 705 where a list of available search categories is displayed to a user. The routine then continues to step 710 where it receives an indication from the user of the search category, and in step 715 receives an indication of a search term value for the search category. In step 720, the routine then determines if more search categories are to be specified, and if so continues to step 725 to receive an indication of a term connector for the previous and next search terms, and then returns to step 710. If it was instead determined that no more categories are to be specified, the routine continues to step 730 to determine accessible gift clusters that match the search criteria, and then continues to step 735 to display a list of those gift clusters to the user. In step 740, the routine next determines if more searches are to occur, and if so returns to step 705, and if not continues to step 795 and ends.

Figure 8:
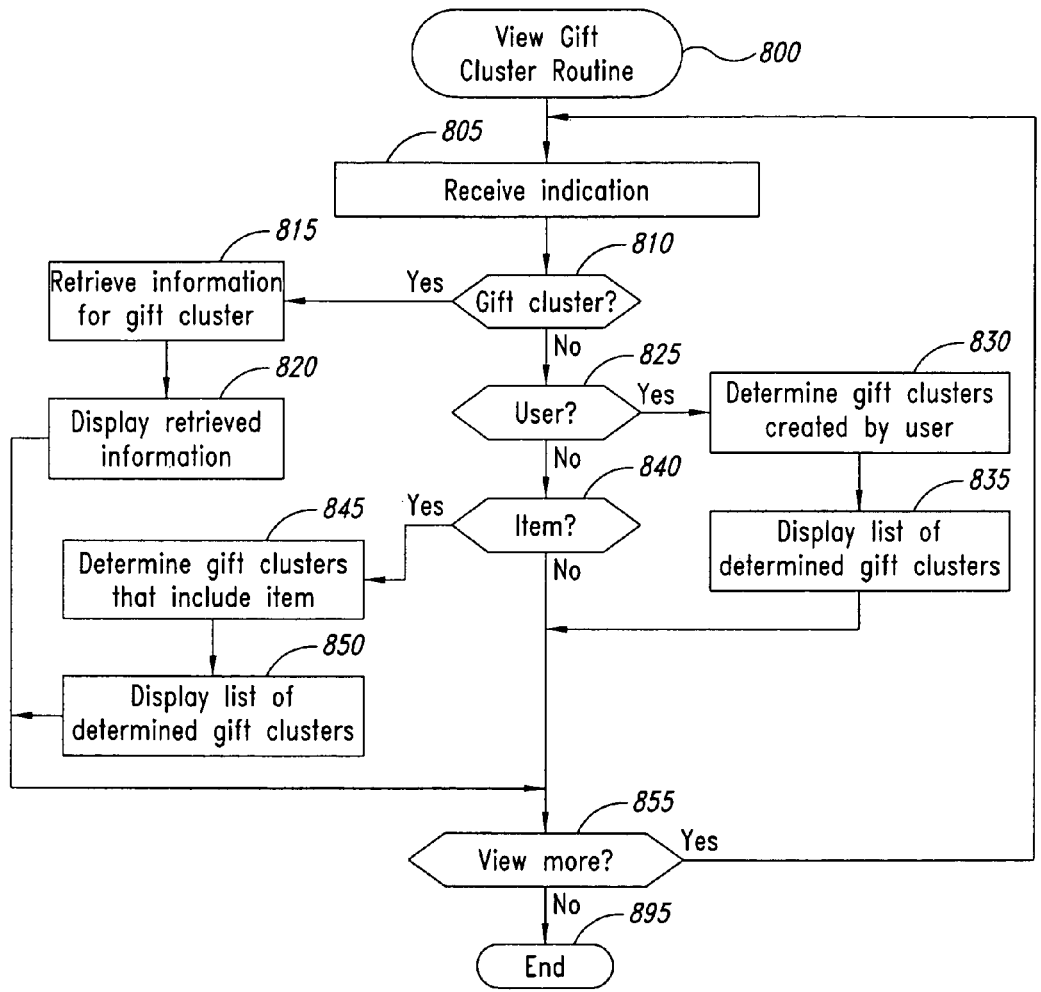
FIG. 8 is a flow diagram of an embodiment of the View Gift Cluster routine.

FIG. 8 is a flow diagram of an embodiment of the View Gift Cluster routine 800. The routine receives an indication of a gift cluster from a user, and displays information about the gift cluster to the user. The routine begins in step 805 where an indication related to a gift cluster is received. The routine continues to step 810 to determine if a particular gift cluster is indicated. If so, the routine continues to step 815 to retrieve information about the gift cluster (e.g., from the Gift Cluster database), and then continues to step 820 to display the retrieved information to the user. If it was instead determined in step 810 that the indication was not a particular gift cluster, the routine continues to step 825 to determine if a particular user was indicated. If so, the routine continues to step 830 to determine gift clusters created by that user, and in step 835 displays a list of those gift clusters to the user who supplied the indication. If it was instead determined in step 825 that a particular user was not indicated, the routine continues to step 840 to determine if a particular item was indicated. If so, the routine continues to step 845 to determine various gift clusters that include the item, and then continues to step 850 to display a list of the determined gift clusters to the user. After steps 820, 835, 850, or if it was instead determined in step 840 that a particular item was not indicated, the routine continues to step 855 to determine if more gift clusters are to be displayed. If so, the routine returns to step 805, and if not the routine continues to step 895 and ends.

Figure 9:
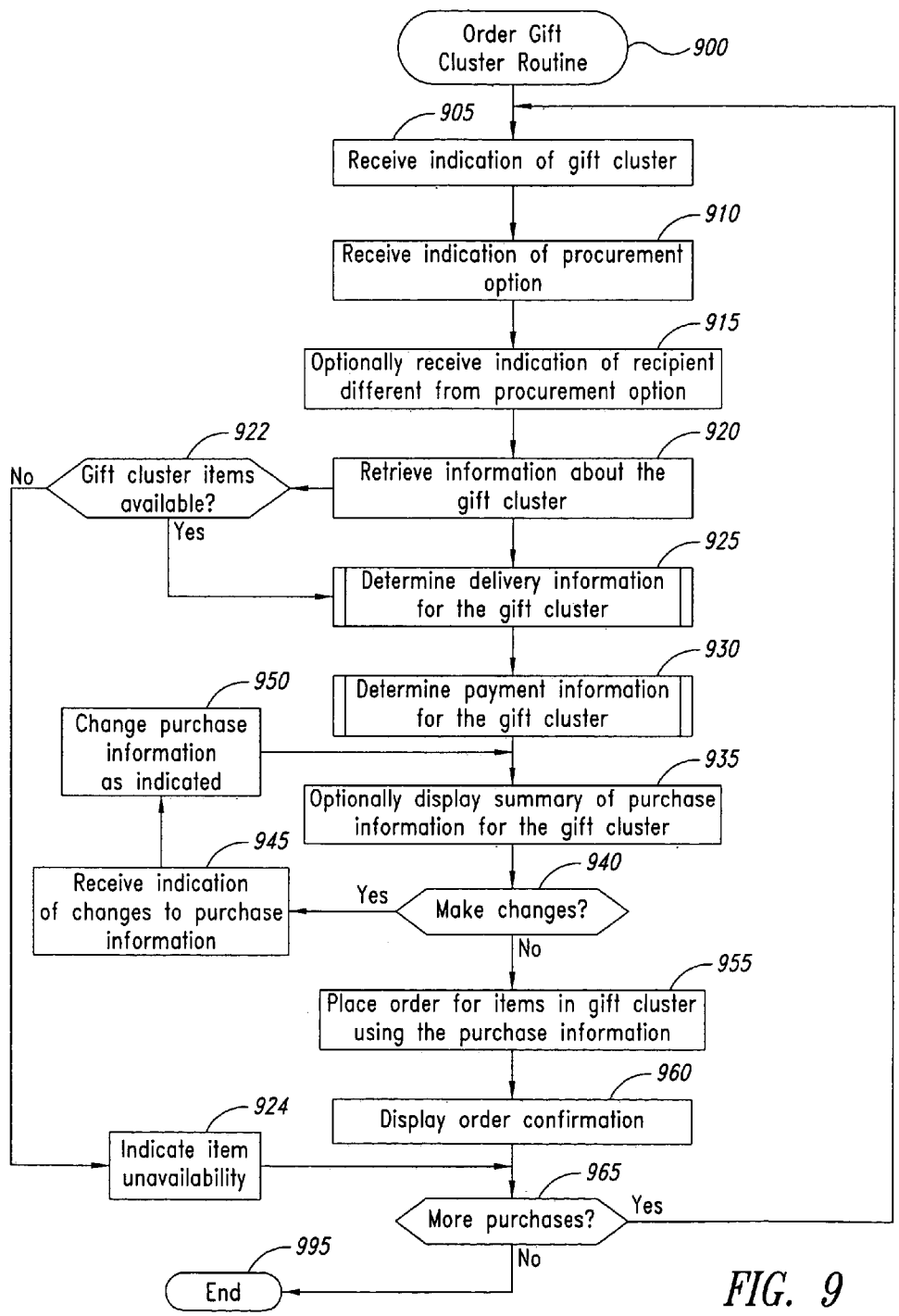
FIG. 9 is a flow diagram of an embodiment of the Order Gift Cluster routine.

FIG. 9 is a flow diagram of an embodiment of the Order Gift Cluster routine 900. The routine receives an indication of a gift cluster, of a recipient, and of payment information, and then orders the gift cluster for the recipient using the payment information. The routine begins in step 905 where an indication of the gift cluster is received. The routine continues to step 910 where an indication of a procurement option is received, with the procurement option optionally containing recipient information, payment information, and other delivery information. Those skilled in the art will appreciate that recipient, payment, and delivery information can be received in a fashion other than via a specified procurement option. The routine next continues to step 915 to optionally receive an indication of one or more recipients that are different from the recipients specified by the procurement option, and if so selects the newly indicated recipients to be the order recipients. The routine next retrieves information about the gift cluster, such as from the Gift Cluster database, and then continues to step 922 to determine if each of the items in the gift cluster are currently available (e.g., from the Item database). If not, the routine continues to step 924 to indicate to the user that the gift cluster is not currently available for delivery, and can optionally indicate the particular items which are not currently available.

If the gift cluster items are available, the routine continues to step 925 to execute the Determine Delivery Information For The Gift Cluster subroutine to gather delivery information, and then to step 930 to execute the Determine Payment Information For The Gift Cluster subroutine to gather payment information. The routine next continues to step 935 to optionally display a summary of the various current ordering information for the gift cluster, and continues to step 940 to determine if the user wishes to make changes to the information or to cancel the order. If the user wishes to make changes, the routine continues to step 945 to receive an indication of a change to be made, then continues to step 950 to change the information as indicated, and then returns back to step 935. If the user instead indicates in step 940 to complete the order using the current order information, the routine continues to step 955 to place an order for the items in the gift cluster as a group using the order information, and then continues to step 960 to display an order confirmation to the user. After steps 924 or 960, the routine continues to step 965 to determine if more orders are to be placed. If so, the routine returns to step 905, and if not the routine continues to step 995 and ends.

Figure 10:
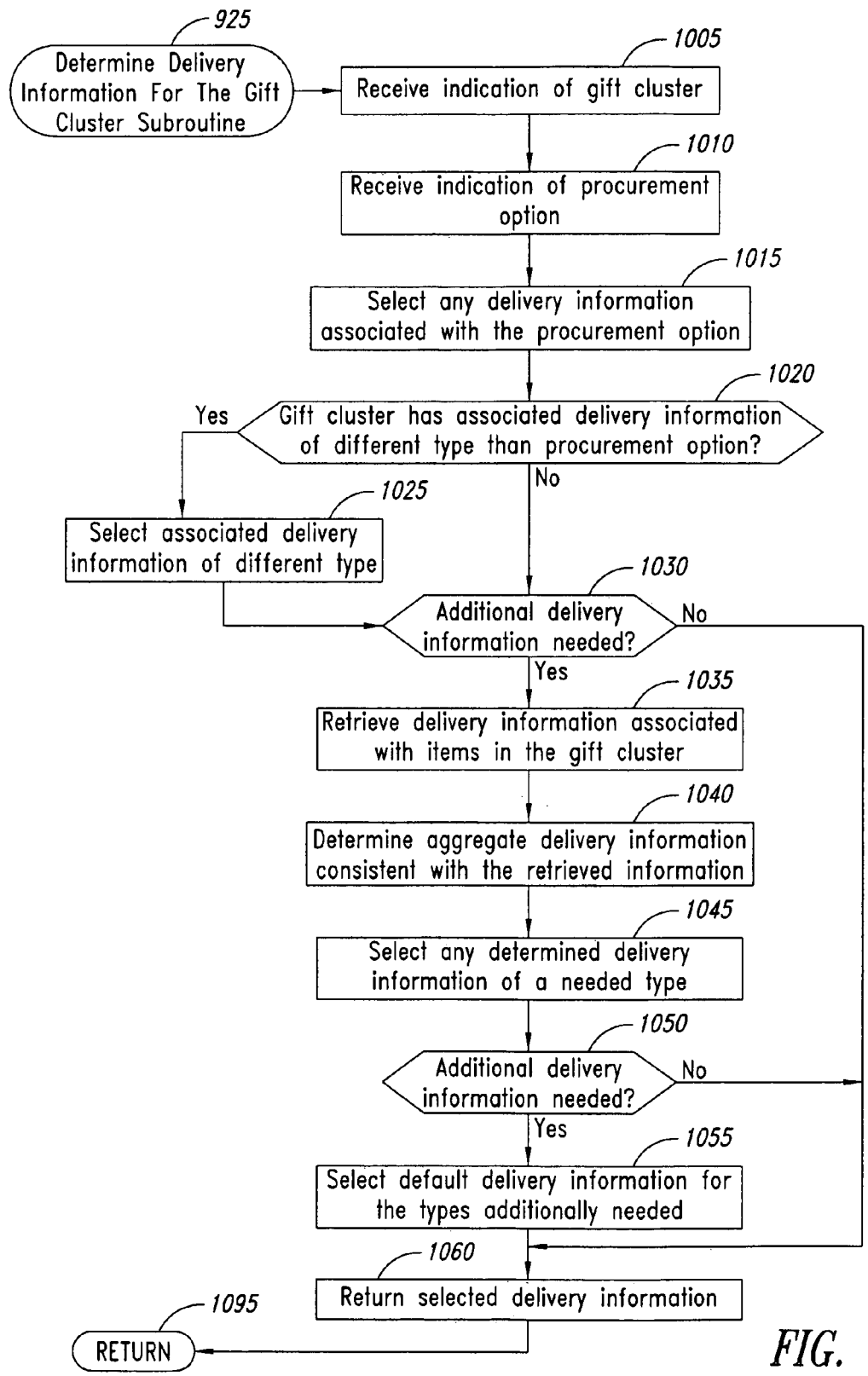
FIG. 10 is a flow diagram of an embodiment of the Determine Delivery Information For The Gift Cluster subroutine.

FIG. 10 is a flow diagram of an embodiment of the Determine Delivery Information For The Gift Cluster subroutine 925. The subroutine receives an indication of a gift cluster, and determines delivery information for an order of the gift cluster. In the illustrated embodiment, the subroutine determines delivery information for the gift cluster without requesting manually specified information, while in other embodiments such information may be manually requested and supplied. The subroutine begins in step 1005 where an indication of a gift cluster is received, and then continues to step 1010 where an indication of a procurement option to be used for the ordering is received. In step 1015, the subroutine selects any delivery information associated with the procurement option, and then continues to step 1020 to determine if the gift cluster has associated delivery information of a different type in the procurement option. If so, the subroutine continues to step 1025 to select the associated delivery information associated with the gift cluster. In the illustrated embodiment, delivery information associated with a gift cluster will override delivery information associated with the procurement option, because aspects of the gift cluster may necessitate special delivery (e.g., overnight delivery may be needed for perishable items).

After step 1025, or if it was determined that the gift cluster did not have different associated delivery information, the subroutine continues to step 1030 to determine if additional delivery information is needed (e.g., when neither the procurement option nor the gift cluster has associated delivery information). If so, the subroutine continues to step 1035 where delivery information associated with items in the gift cluster is retrieved. The subroutine then continues to step 1040 to determine aggregate delivery information that is consistent with the retrieved item delivery information, and in step 1045 selects any determined delivery information of a type that is needed. Thus, in the illustrated embodiment, delivery information associated with either the procurement option or the gift cluster overrides item-specific delivery information. The subroutine then continues to step 1050 to determine if additional delivery information is needed, and if so selects default delivery information for the types additionally needed. After step 1055, or if it was instead determined in steps 1030 or 1050 that additional delivery information is not needed, the subroutine continues to step 1060 to return the selected delivery information. The subroutine then continues to step 1095 and returns.

Figure 11:
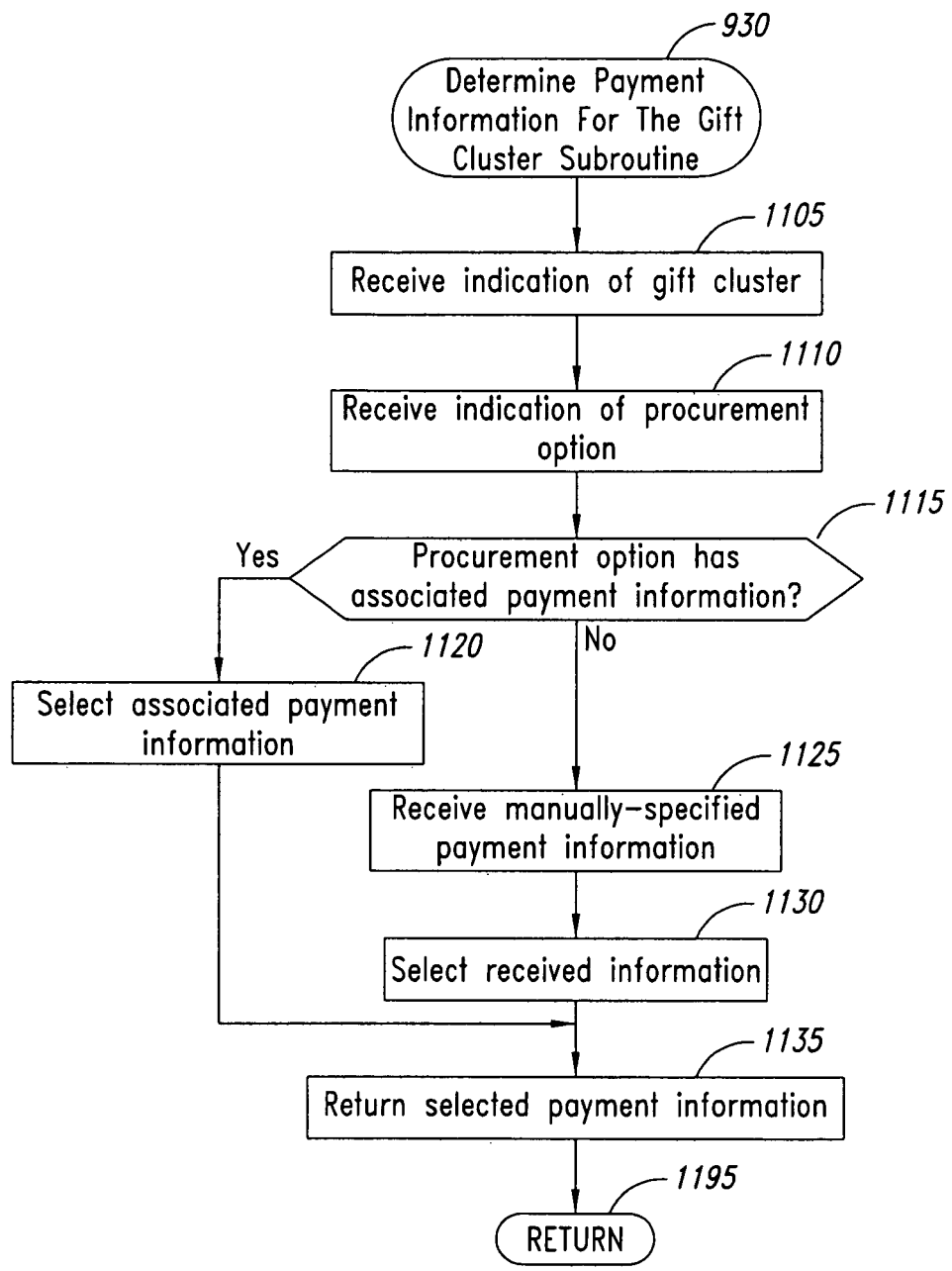
FIG. 11 is a flow diagram of an embodiment of the Determine Payment Information For The Gift Cluster subroutine.

FIG. 11 is a flow diagram of an embodiment of the Determine Payment Information For The Gift Cluster subroutine 930. The subroutine receives an indication of a gift cluster, and determines payment information for an order of the gift cluster. In the illustrated embodiment, payment information for the gift cluster is determined automatically if possible, and manually if not. The subroutine begins in step 1105 where an indication of the gift cluster is received, and in step 1110 then receives an indication of a procurement option to be used for the ordering. The subroutine next continues to step 1115 to determine if the procurement option has sufficient associated payment information. If so, the subroutine continues to step 1120 to select the associated payment information. If not, the subroutine instead continues to step 1125 to receive manually specified payment information, and in step 1130 then selects the received information. After steps 1120 or 1130, the subroutine continues to step 1135 where it returns the selected payment information. The subroutine then continues to step 1195 and returns.

Although the present invention has been described in terms of various embodiments, it is not intended that the invention be limited to these embodiments. Modification within the spirit of the invention will be apparent to those skilled in the art. For example, various different single actions can be used to effect the placement of an order, such as a voice command spoken by the purchaser, a key depressed by the purchaser, a button on a television remote control device depressed by the purchaser, or a selection effected using any pointing device. Although a single action may be preceded by multiple physical movements of the purchaser (e.g., moving a mouse so that a mouse pointer is over a button, displaying a list of possible procurement options), the single action generally refers to a single event received by a client system that indicates to place the order. The scope of the present invention is defined by the claims that follow.

The invention claimed is:

1. A non-transitory computer-readable storage medium having stored contents including instructions that, when executed, configure a computer system to perform a method, the method comprising:
    determining, by the configured computer system, one or more categories associated with a user-defined group of multiple items that is defined by a first user to be treated as a group, the first user being one of multiple customers of an item ordering service that makes the multiple items available to the multiple customers;
    providing, by the configured computer system, information for display to a second user that identifies the user-defined group of multiple items based on at least one of the associated categories for the user-defined group, wherein the second user is one of the multiple customers and is distinct from the first user, and wherein the provided information, when displayed, identifies the user-defined group of multiple items as a single item to be ordered and includes a visual indication of an action that is to be performed to order the user-defined group of multiple items from the item ordering service as the single item;
    in response to the indicated action being performed by the second user, initiating an order of the user-defined group of multiple items for the second user; and
    based at least in part on the defining of the user-defined group of multiple items by the first user, compensating the first user.

2. The non-transitory computer-readable storage medium of claim 1 wherein the initiating of the order is performed to cause delivery to an indicated recipient of the multiple items together as a group.

3. The non-transitory computer-readable storage medium of claim 1 wherein the provided information identifies multiple user-defined groups each having multiple items, and wherein performance by the second user of the indicated action includes a selection by the second user of which of the multiple user-defined groups of multiple items is to be ordered.

4. The non-transitory computer-readable storage medium of claim 1 wherein the user-defined group includes an item representing a product to be supplied and an item representing a service to be provided, and includes items that are different types of products.

5. The non-transitory computer-readable storage medium of claim 1 wherein the user-defined group includes an item that is another user-defined group of multiple items.

6. The non-transitory computer-readable storage medium of claim 1 wherein the user-defined group has associated shipping instructions specified by the first user, and wherein the initiating of the order is performed to cause delivery of the multiple items as specified by the shipping instructions.

7. The non-transitory computer-readable storage medium of claim 1 wherein the providing of the information is performed in response to determining that the user-defined group satisfies one or more search criteria specified by the second user, the one or more search criteria including an indication of the at least one category associated with the group.

8. The non-transitory computer-readable storage medium of claim 1 wherein the method further comprises, before the providing of the information, defining the group of multiple items based on one or more received indications from the first user.

9. The non-transitory computer-readable storage medium of claim 8 wherein the method further comprises receiving an instruction from the first user to make the defined group of multiple items available for ordering by customers other than the first user.

10. The non-transitory computer-readable storage medium of claim 1 wherein the providing of the information based on the at least one associated category for the user-defined group includes providing categorization information related to the user-defined group for display that includes an indication of the at least one category.

11. The non-transitory computer-readable storage medium of claim 10 wherein the indicated at least one category reflects at least one of one or more occasions for which the user-defined group is appropriate, of a mnemonic moniker associated with the user-defined group, and of one or more types of users for which the user-defined group is appropriate.

12. The non-transitory computer-readable storage medium of claim 1 wherein the determining of the one or more categories associated with the user-defined group of multiple items includes receiving information from the first user that indicates the one or more categories.

13. The non-transitory computer-readable storage medium of claim 1 wherein the one or more categories associated with the user-defined group are automatically determined by the configured computer system based at least in part on aggregating information about multiple recipients for whom the user-defined group of multiple items is acquired.

14. The non-transitory computer-readable storage medium of claim 1 wherein the one or more categories associated with the user-defined group are automatically determined by the configured computer system based at least in part on aggregating information about the multiple items of the user-defined group.

15. The non-transitory computer-readable storage medium of claim 1 wherein the providing of the information based on the at least one category for the user-defined group includes receiving one or more search criteria from the second user that include the at least one category.

16. The non-transitory computer-readable storage medium of claim 1 wherein the multiple items of the user-defined group are associated with one or more categories, and wherein the one or more determined categories for the user-defined group of multiple items are distinct from the one or more categories associated with the multiple items.

17. The non-transitory computer-readable storage medium of claim 1 wherein the computer-readable storage medium is a memory of the computer system that stores the contents.

18. A configured computer system comprising:
    one or more processors;

a categorizer component that is configured to, when executed by at least one of the one or more processors, determine one or more first categories for a user-defined group of multiple items, the user-defined group being defined by a user that is one of multiple customers of an item ordering service that makes the multiple items available to the multiple customers, at least one of the multiple items being associated with one or more second categories that are not included in the one or more determined first categories;

a viewer component that is configured to, when executed by at least one of the one or more processors, provide information for display to the user identifying the user-defined group of multiple items as a single item to be ordered, wherein the information, when displayed, indicates an action that is to be performed to order the user-defined group of multiple items from the item ordering service as the single item; and an item ordering component that is configured to, when executed by at least one of the one or more processors, and after performance by the user of the indicated action, initiate an order for the user-defined group of multiple items for the user.

19. The computer system of claim 18 wherein the initiating of the order is performed to deliver the multiple items to an indicated recipient as a group.

20. The computer system of claim 18 wherein the providing of the information for display includes identifying multiple groups each defined by a user and each having one or more items, and wherein performance by the user of the indicated action includes a selection by the user of the user-defined group of multiple items to be ordered.

21. The computer system of claim 18 wherein the viewer component is further configured to provide information for display to a second user distinct from the user that identifies the user-defined group of multiple items as a single item to be ordered, and wherein the item ordering component is further configured to initiate ordering for the second user of the user-defined group of multiple items in response to an instruction from the second user.

22. The computer system of claim 18 wherein the user-defined group includes an item representing a product to be supplied and an item representing a service to be provided, and includes items that are different types of products.

23. The computer system of claim 18 wherein the user-defined group has associated shipping instructions specified by the user, and wherein the initiating of the order is performed to cause delivery of the multiple items as specified by the shipping instructions.

24. The computer system of claim 18 wherein the providing of the information is performed in response to determining that the user-defined group satisfies one or more search criteria specified by the user, the one or more search criteria including an indication of at least one of the determined one or more categories.

25. The computer system of claim 18 further comprising oneor more components configured to, before the providing of the information, define the group of multiple items based on received indications from the user.

26. The computer system of claim 25 wherein the one or more components are further configured to make the defined group of multiple items available for ordering by the multiple customers in response to a received instruction from the user.

27. The computer system of claim 18 further comprising one or more memories.

28. The computer system of claim 18 wherein the categorizer component consists of a means for performing the determining of the one or more first categories associated with the multiple items of the user-defined group, wherein the viewer component consists of a means for performing the providing of the information for display to the user identifying the user-defined group of multiple items as a single item to be ordered, and wherein the item ordering component consists of a means for performing the initiating of the order for the user-defined group of multiple items for the user.

29. A computer-implemented method, comprising:

determining, by one or more configured computing systems, one or more first categories for a user-defined group of multiple items, the user-defined group being defined by a user that is one of multiple customers of an item ordering service that makes the multiple items available to the multiple customers, at least one of the multiple items being associated with one or more second categories that are not included in the one or more determined first categories;

providing, by the one or more configured computing systems, information for display to the user identifying the user-defined group of multiple items as a single item to be ordered, wherein the information, when displayed, indicates an action that is to be performed to order the user-defined group of multiple items from the item ordering service as the single item; and after performance by the user of the indicated action, initiating, by the one or more configured computing systems, an order for the user-defined group of multiple items for the user.

30. The method of claim 29 further comprising receiving an indication of a recipient to whom the ordered group of multiple items is to be delivered as a group, and wherein the initiating of the order for the user-defined group of multiple items is performed in accordance with the received indication.

31. The method of claim 29 wherein the provided information enables the indicated action by providing an indication of a user-selectable control to be displayed to the user, the user-selectable control for use by the user to indicate to place the order for the user-defined group of multiple items as a group without any further interaction by the user.

32. The method of claim 31 wherein the provided information further includes an indication of an additional user-selectable control to be displayed to the user, the additional user-selectable control for use by the user to add the user-defined group to a collection of items for later ordering.

33. The method of claim 29 wherein the user-defined group of multiple items is a first group, wherein the provided information identifies multiple user-defined groups each having multiple items to be displayed to the user, the multiple user-defined groups including the user-defined first group of multiple items, and wherein the indicated action performed by the user includes an indication of a selection by the user of the user-defined first group of multiple items to be ordered.

34. The method of claim 33 wherein the multiple user-defined groups of multiple items are each previously defined by one of the multiple customers of the item ordering service.

35. The method of claim 33 wherein each of the multiple user-defined groups has one or more associated categories, and wherein the multiple user-defined groups are selected for display to the user based on the associated categories of the multiple user-defined groups having at least one common category.

36. The method of claim 29 wherein the user-defined group includes an item representing a product to be supplied and an item representing a service to be provided.

37. The method of claim 29 wherein the user-defined group includes items that are different types of products.

38. The method of claim 29 wherein the user-defined group includes an item that is another user-defined group of multiple items.

39. The method of claim 29 wherein the user-defined group has associated shipping instructions that are specified by the user, and wherein the initiating of the order is performed to deliver the multiple items of the user-defined group as specified by the shipping instructions.

40. The method of claim 29 wherein the user-defined group has associated wrapping instructions for the multiple items that are specified by the user, and wherein the initiating of the order is performed to wrap the multiple items of the user-defined group as specified by the wrapping instructions.

41. The method of claim 29 wherein the provided information is at least part of a Web page for display on a client system of the user.

42. The method of claim 29 further comprising, under control of a client system of the user, displaying the provided information to the user, receiving an indication of the indicated action being performed by the user, and providing an indication to the one or more configured computing systems of the indicated action being performed.

43. The method of claim 42 wherein the performing of the indicated action by the user includes clicking a mouse button when a cursor is positioned over a visual indication corresponding to the indicated action that is displayed as part of the displayed information.

44. The method of claim 29 wherein the providing of the information identifying the user-defined first group of multiple items to the user is performed in response to determining that the user-defined group satisfies one or more search criteria specified by the user, the one or more search criteria including an indication of at least one of the determined one or more first categories for the user-defined group.

45. The method of claim 44 further comprising assisting the user to specify the one or more search criteria by:
    providing indications to the user of multiple categories related to multiple user-defined groups of items, the multiple categories including the at least one determined category; and
    receiving indications from the second user of a selection of at least one of the multiple categories.

46. The method of claim 44 wherein the one or more search criteria that the user-defined group satisfies relate to popularity of the user-defined group among other users.

47. The method of claim 44 wherein the one or more search criteria that the user-defined group satisfies relate to demographic information about an intended recipient.

48. The method of claim 44 wherein the one or more search criteria that the user-defined group satisfies identify groups of multiple items that each has a specified price.

49. The method of claim 44 wherein the one or more search criteria that the user-defined group satisfies identify groups of multiple items defined for a specified recipient.

50. The method of claim 44 wherein the one or more search criteria that the user-defined first group satisfies identify user-defined groups appropriate for a specified occasion.

51. The method of claim 44 wherein the one or more search criteria that the user-defined group satisfies identify groups of multiple items defined for users with specified interests.

52. The method of claim 29 further comprising, before the providing of the information, creating the user-defined group of multiple items based on received instructions from the user.

53. The method of claim 52 further comprising assisting the user to define the group of multiple items by:
    providing indications of multiple items for display to the user; and
    in response to received indications of at least some of the multiple items, adding the indicated items to the user-defined group.

54. The method of claim 52 wherein the received instructions include an indication from the user to make the user-defined group of multiple items available to other users for ordering.

55. The method of claim 29 wherein the user-defined group of multiple items is at least part of a gift cluster.

56. The method of claim 55 wherein the gift cluster is defined by the user for use in ordering the multiple items together as a single item.

57. The method of claim 56 wherein the gift cluster is further defined by the user for use in having the multiple items delivered together as a group to a recipient.

58. The method of claim 29 wherein the user-defined group of multiple items is defined by the user for use in ordering the multiple items as a single item.

59. The method of claim 29 wherein the user-defined group of multiple items is defined by the user for use in ordering the multiple items as a group multiple times.

60. The method of claim 29 wherein the initiating of the order for the user-defined first group of multiple items includes treating the user-defined group of multiple items as a single item.

61. The method of claim 29 further comprising processing the order of the user-defined group of multiple items and initiating delivery of the multiple items of the user-defined group together as a single item.

62. The method of claim 29 wherein the information identifying the user-defined group of multiple items as a single item includes a single price to be displayed for ordering of the group of multiple items together.

63. The method of claim 29 wherein the information identifying the user-defined group of multiple items as a single item includes a single delivery date for delivery of all the multiple items of the user-defined first group together.

64. The method of claim 29 wherein the information identifying the user-defined group of multiple items as a single item includes an indication of whether all or none of the multiple items of the user-defined group are currently available in inventory of the item ordering service.

65. The method of claim 29 further comprising compensating the user for defining the user-defined first group of multiple items.

66. The method of claim 65 wherein the compensating of the user for defining the user-defined group of multiple items is based at least in part on making the user-defined group of multiple items available for ordering by others.

67. The method of claim 65 wherein the compensating of the user for defining the user-defined first group of multiple items is based at least in part on one or more other users ordering the user-defined group of multiple items.

* * * * *

UNITED STATES PATENT AND TRADEMARK OFFICE
CERTIFICATE OF CORRECTION

| | |
|---|---|
| PATENT NO. | : 8,738,470 B2 |
| APPLICATION NO. | : 11/298985 |
| DATED | : May 27, 2014 |
| INVENTOR(S) | : Amit D. Agarwal |

It is certified that error appears in the above-identified patent and that said Letters Patent is hereby corrected as shown below:

In the Claims

Column 24, Line 57:
"oneor more components configured to, before the providing" should read, --one or more components configured to, before the providing--.

Signed and Sealed this
Twenty-fourth Day of February, 2015

Michelle K. Lee
*Deputy Director of the United States Patent and Trademark Office*